Figure 2:
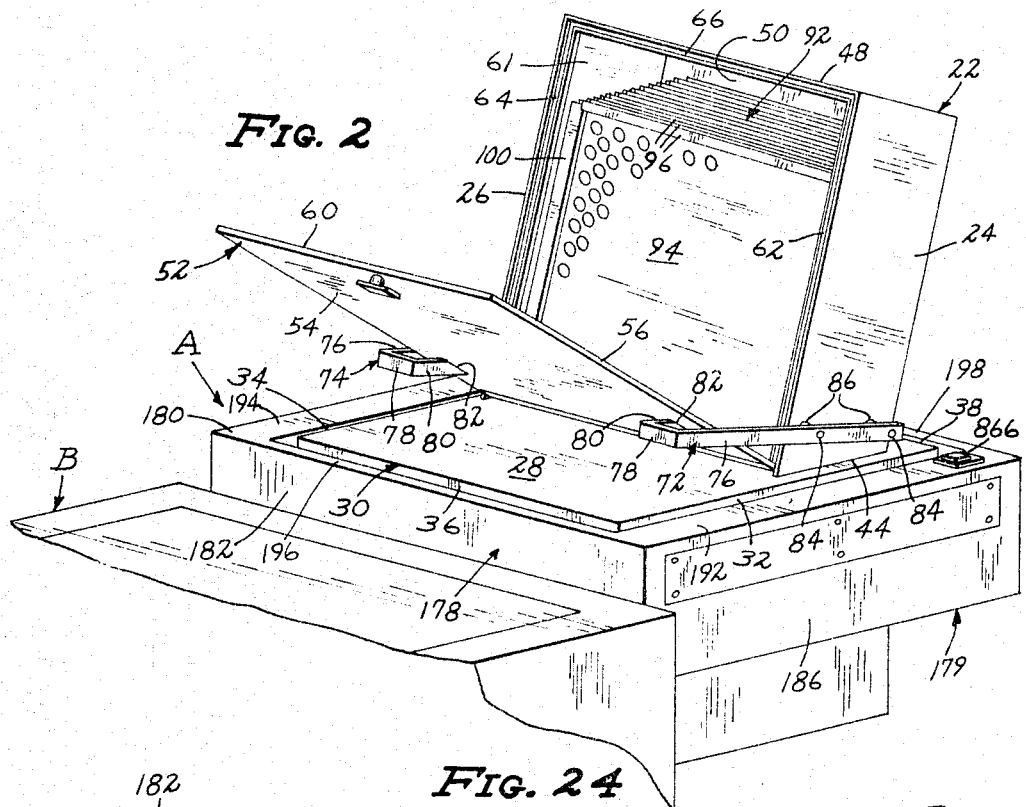

Oct. 4, 1966
K. J. KALLENBERG
3,276,769
DEVICE FOR STORING AND FEEDING EXPOSED
SHEET FILM TO A FILM PROCESSOR
Filed April 1, 1964
13 Sheets-Sheet 1
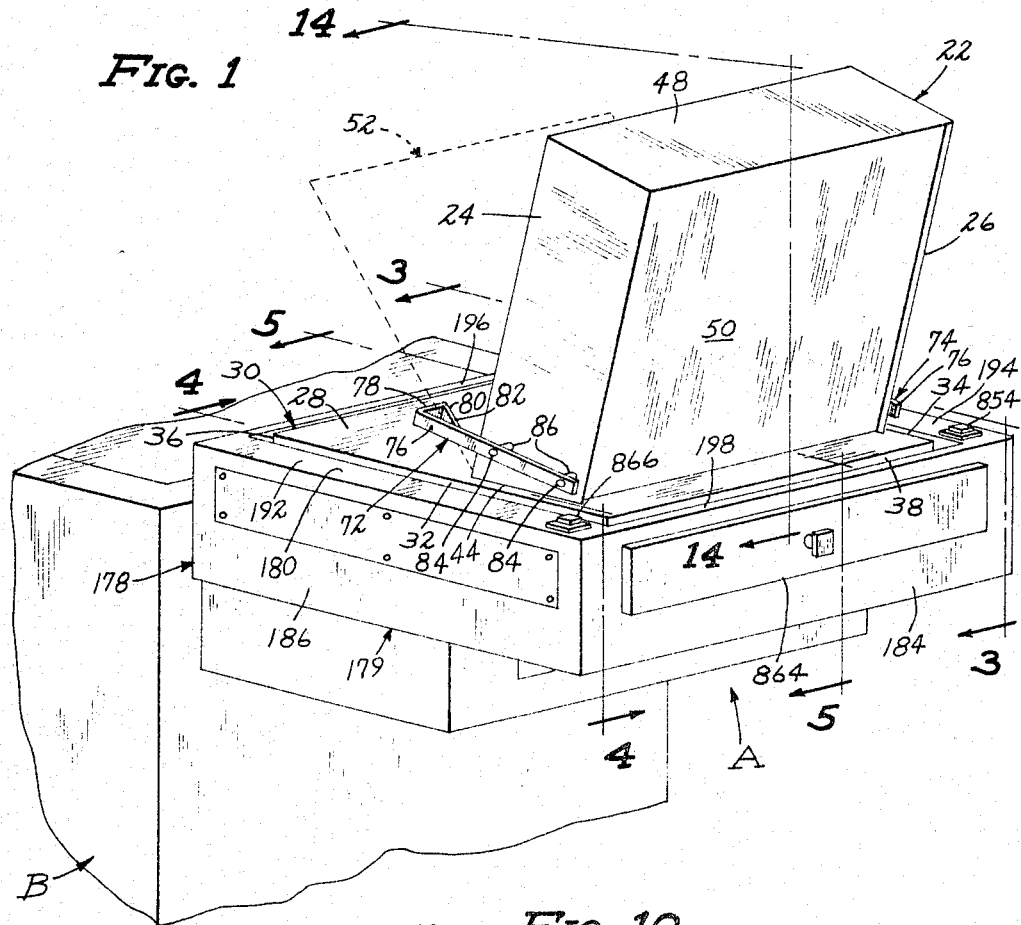
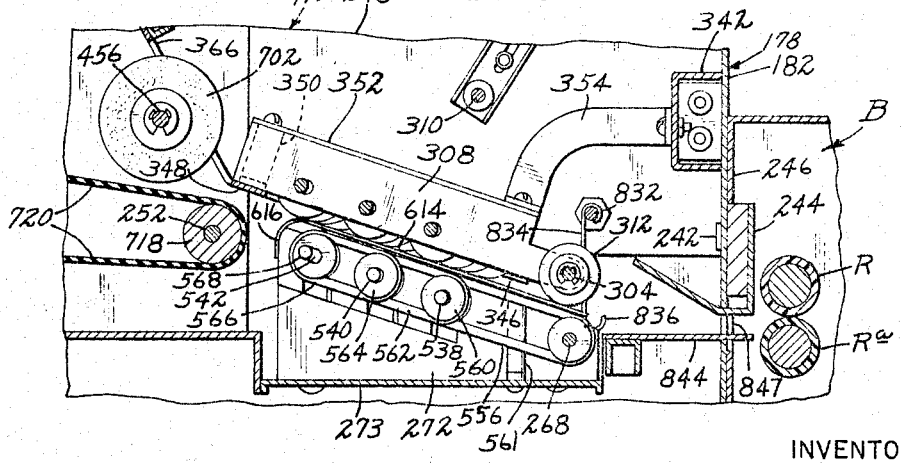
INVENTOR
KARL J. KALLENBERG
BY
Caswell, Lagaard & Wicks
ATTORNEYS Oct. 4, 1966  K. J. KALLENBERG  3,276,769
DEVICE FOR STORING AND FEEDING EXPOSED
SHEET FILM TO A FILM PROCESSOR
Filed April 1, 1964  13 Sheets-Sheet 2

INVENTOR
KARL J. KALLENBERG
BY
Caswell, Lagaard & Wicks
ATTORNEYS

INVENTOR
KARL J. KALLENBERG
BY
Caswell, Lazaard & Wicks
ATTORNEYS

Oct. 4, 1966 K. J. KALLENBERG 3,276,769
DEVICE FOR STORING AND FEEDING EXPOSED
SHEET FILM TO A FILM PROCESSOR
Filed April 1, 1964 13 Sheets-Sheet 4

INVENTOR
KARL J. KALLENBERG
BY
Caswell, Lagaard & Wicks
ATTORNEYS

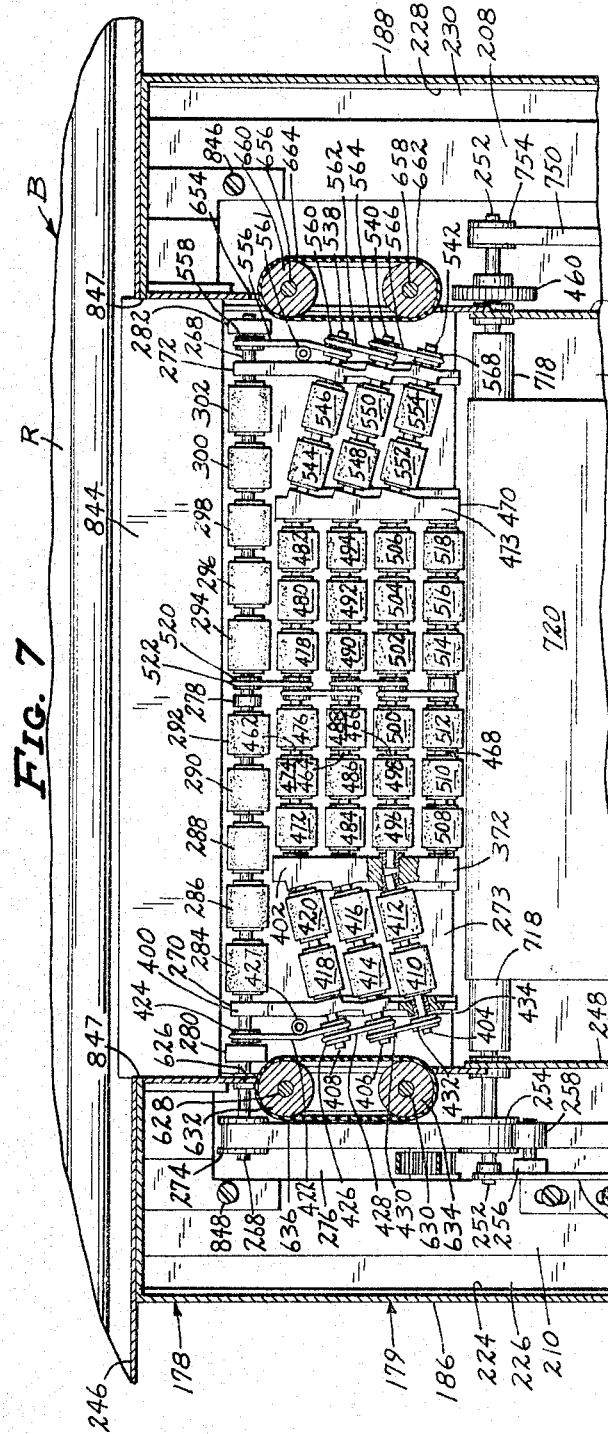
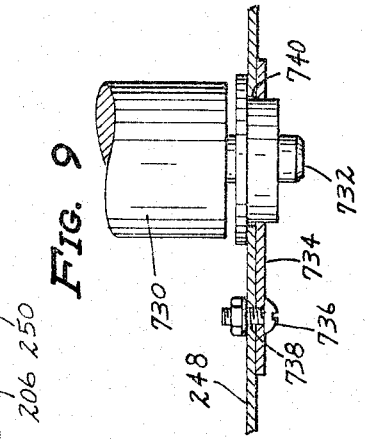
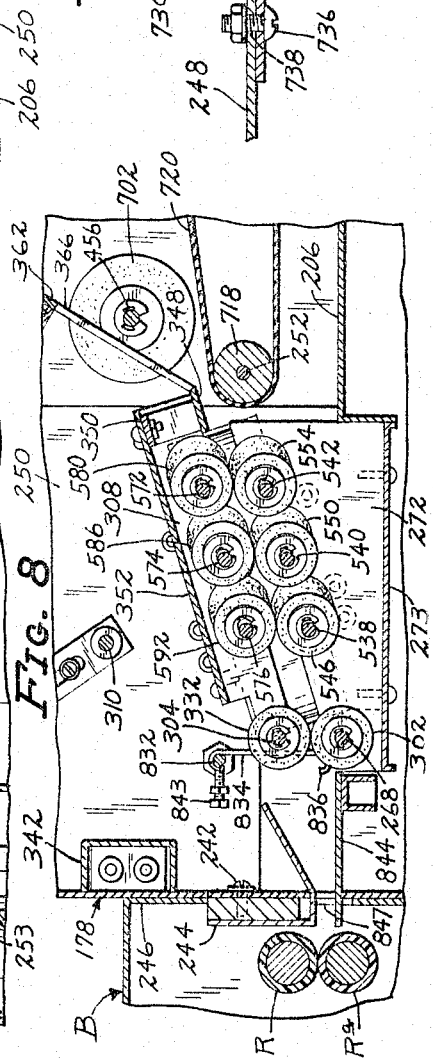
FIG. 7
FIG. 9
FIG. 8
INVENTOR
KARL J. KALLENBERG
BY
Caswell, Lagaard & Wicks
ATTORNEYS Oct. 4, 1966 K. J. KALLENBERG 3,276,769
DEVICE FOR STORING AND FEEDING EXPOSED
SHEET FILM TO A FILM PROCESSOR
Filed April 1, 1964 13 Sheets-Sheet 7

INVENTOR
KARL J. KALLENBERG
BY
Caswell, Legaard & Hicks
ATTORNEYS

INVENTOR
KARL J. KALLENBERG
BY
Caswell, Lagaard & Hicks
ATTORNEYS

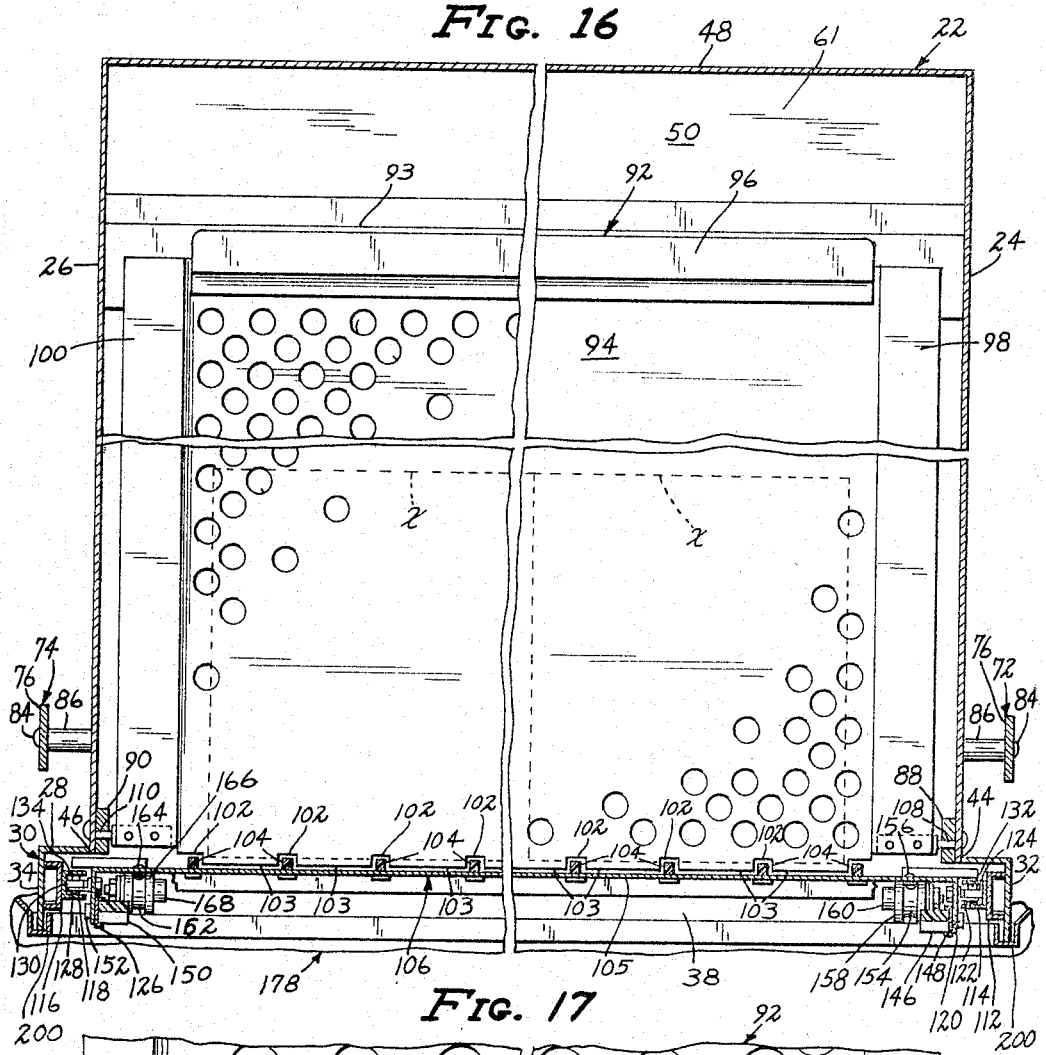
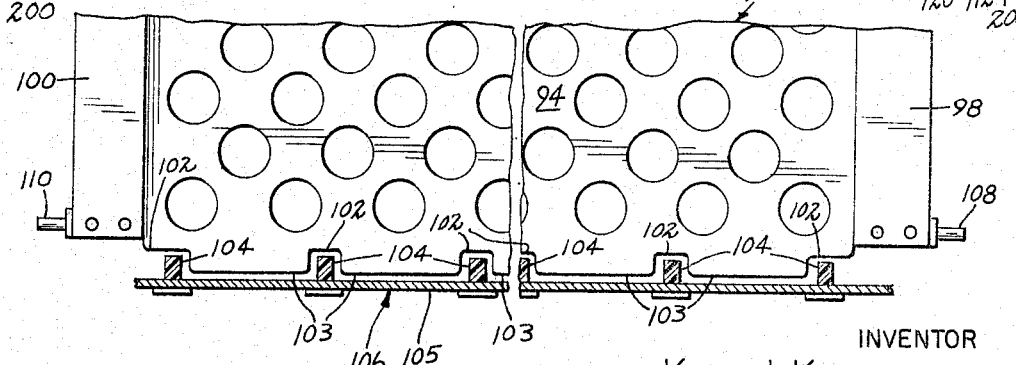

Oct. 4, 1966 K. J. KALLENBERG 3,276,769
DEVICE FOR STORING AND FEEDING EXPOSED
SHEET FILM TO A FILM PROCESSOR
Filed April 1, 1964 13 Sheets-Sheet 11
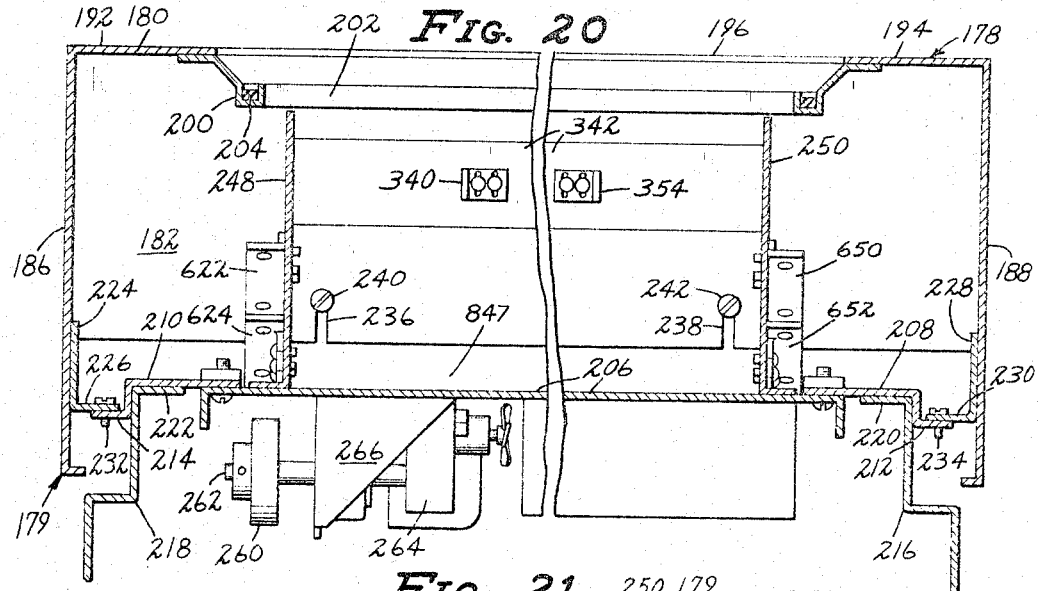
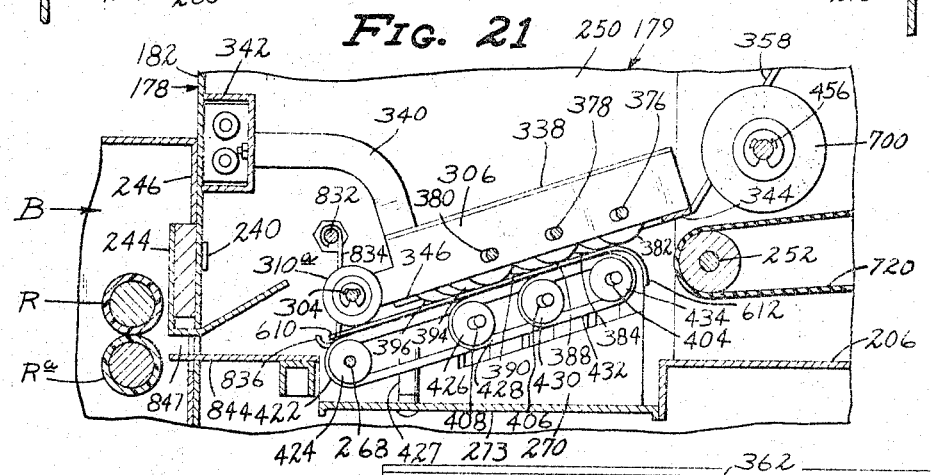
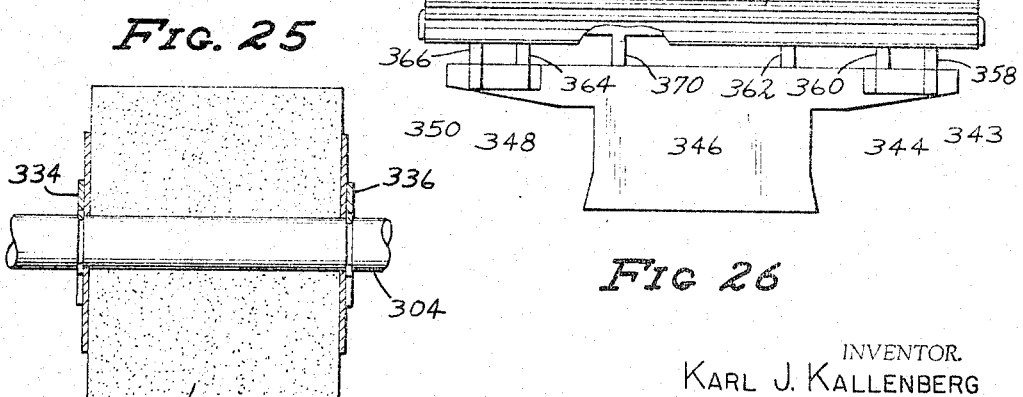
INVENTOR.
KARL J. KALLENBERG
BY
Caswell, Lagaard & Wicks
ATTORNEYS

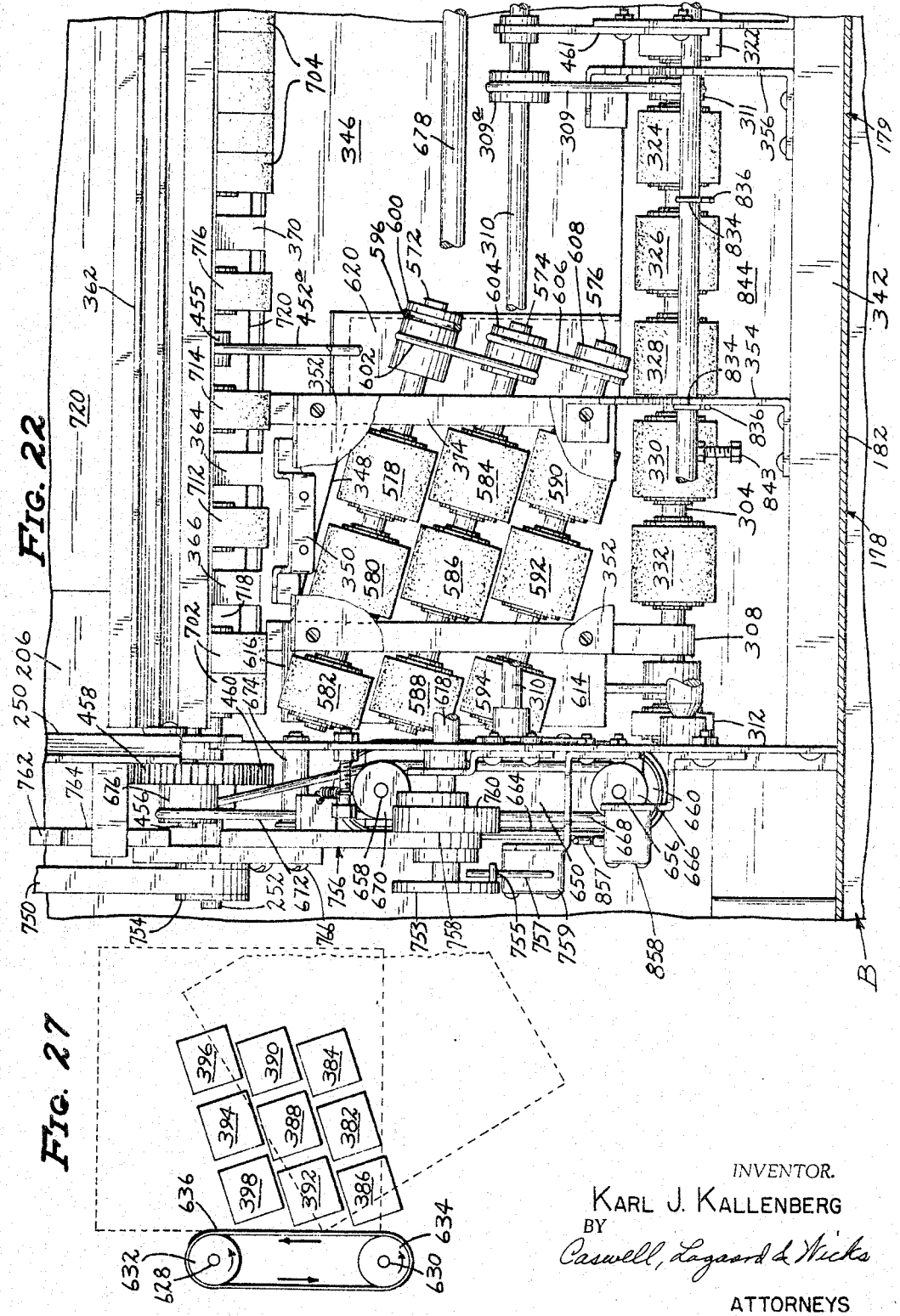

Oct. 4, 1966
K. J. KALLENBERG
3,276,769
DEVICE FOR STORING AND FEEDING EXPOSED
SHEET FILM TO A FILM PROCESSOR
Filed April 1, 1964
13 Sheets-Sheet 13
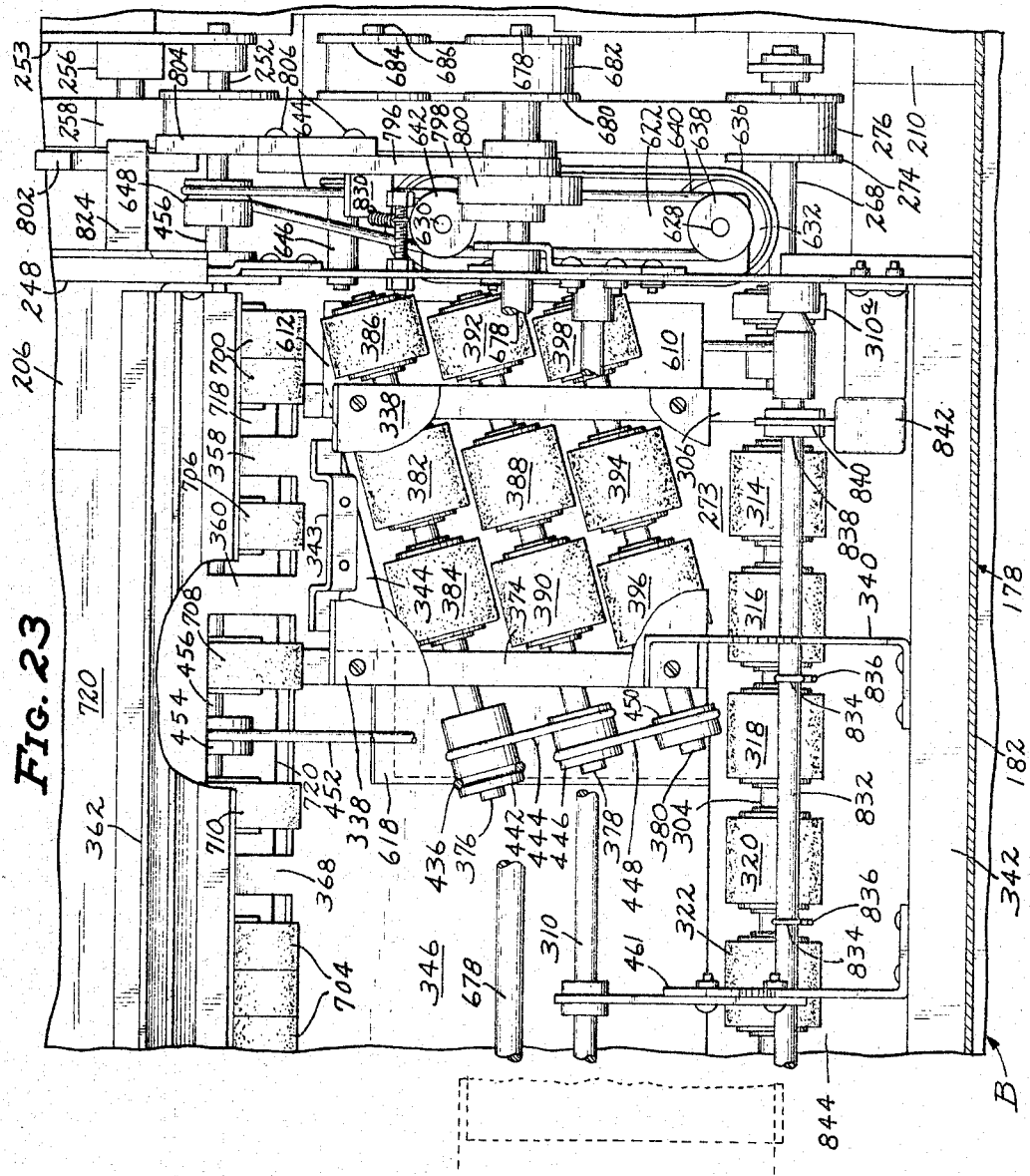
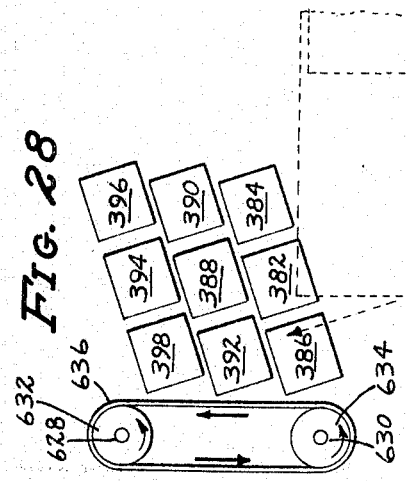
INVENTOR
KARL J. KALLENBERG
BY
Caswell, Lagaard & Hicks
ATTORNEYS United States Patent Office 3,276,769
Patented Oct. 4, 1966

3,276,769
DEVICE FOR STORING AND FEEDING EXPOSED
SHEET FILM TO A FILM PROCESSOR
Karl J. Kallenberg, Minneapolis, Minn., assignor to Pako
Corporation, Minneapolis, Minn.
Filed Apr. 1, 1964, Ser. No. 356,531
31 Claims. (Cl. 271—10)

This invention relates broadly to an improvement in photographic equipment and more particularly to a device for storing and feeding sheet film to a film processor.

It is an object of the invention to provide a magazine having a hopper in which are mounted a multiplicity of film trays, each of which trays may be loaded with exposed sheet film in a darkened room, the magazine closed and mounted on a base having means for transporting the film sheet sequentially from the magazine to a film processor to which the base is attached.

It is also an object to provide a mechanism for discharging film sheets sequentially from the magazine and to also provide for transporting the film sheets discharged from the magaizne to a film processor.

It is a further object to provide a canted roller mechanism in the film transport mechanism of the base for aligning misaligned film sheets as the same proceed through the base. The canted roller mechanism also separates film sheets that may be overlapped on the film transporting means as may be the case where two film sheets are released from a single film tray.

It is an additional object to provide a magazine having means for excluding light from entering the discharge opening and the loading door thereof after the magazine has been loaded with film sheets whereby the magazine may be mounted on the base of the unit and operated in a lighted room.

It is also an object to provide the above magazine having means for feeding first to the processor the film sheet first loaded in the magazine.

It is still a further object to provide means for causing the film sheets to be transported through the device at spaced intervals.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the device shown as attached to a film processor, only a portion of the processor being shown.

Figure 24:
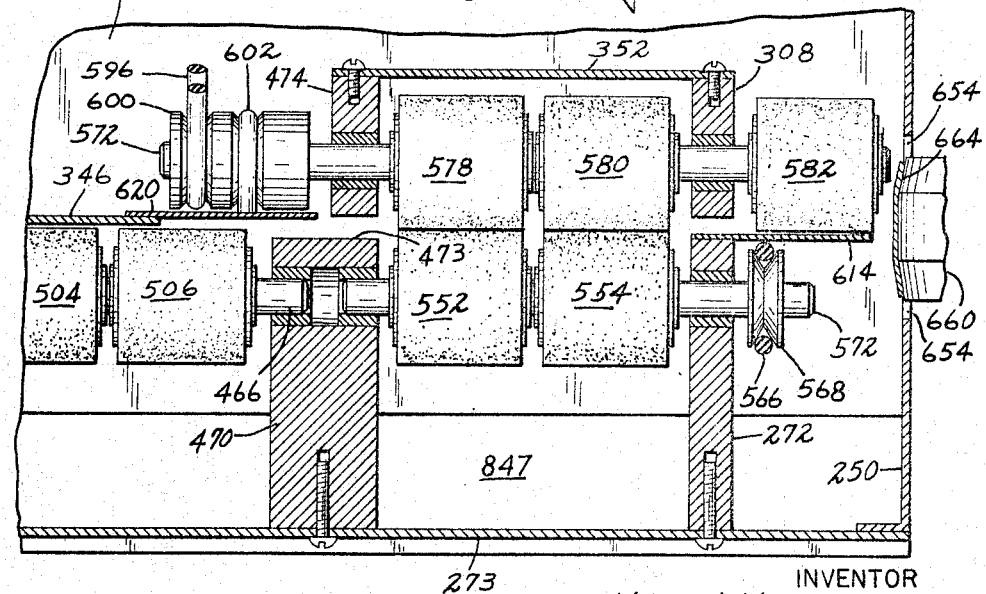
Figure 3:
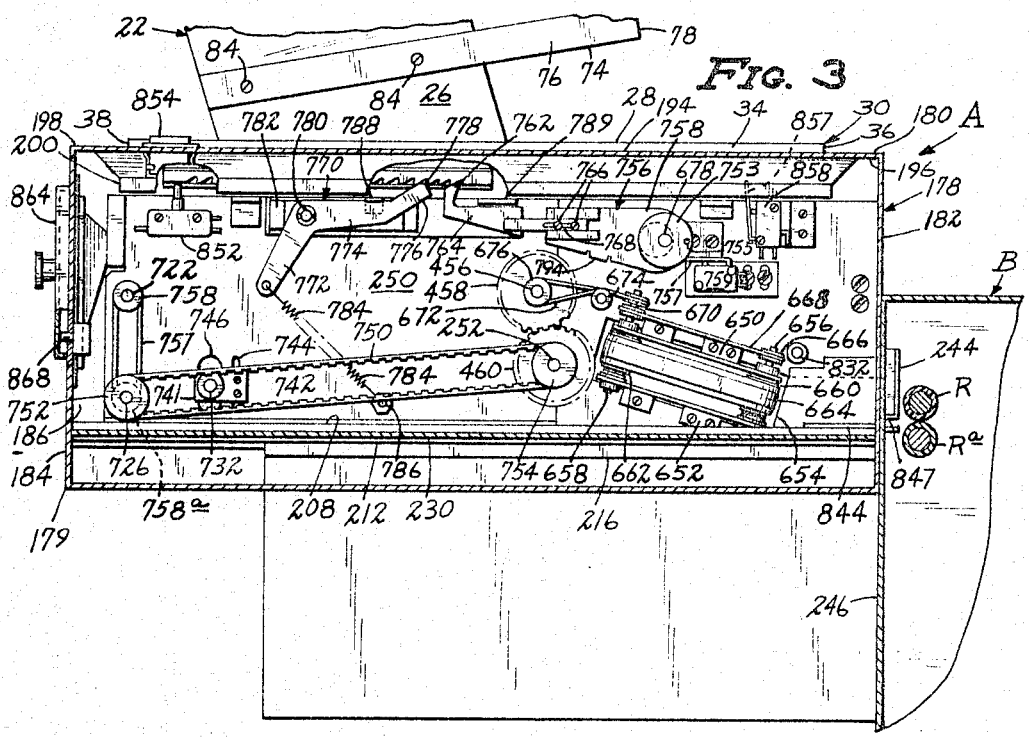
Figure 4:
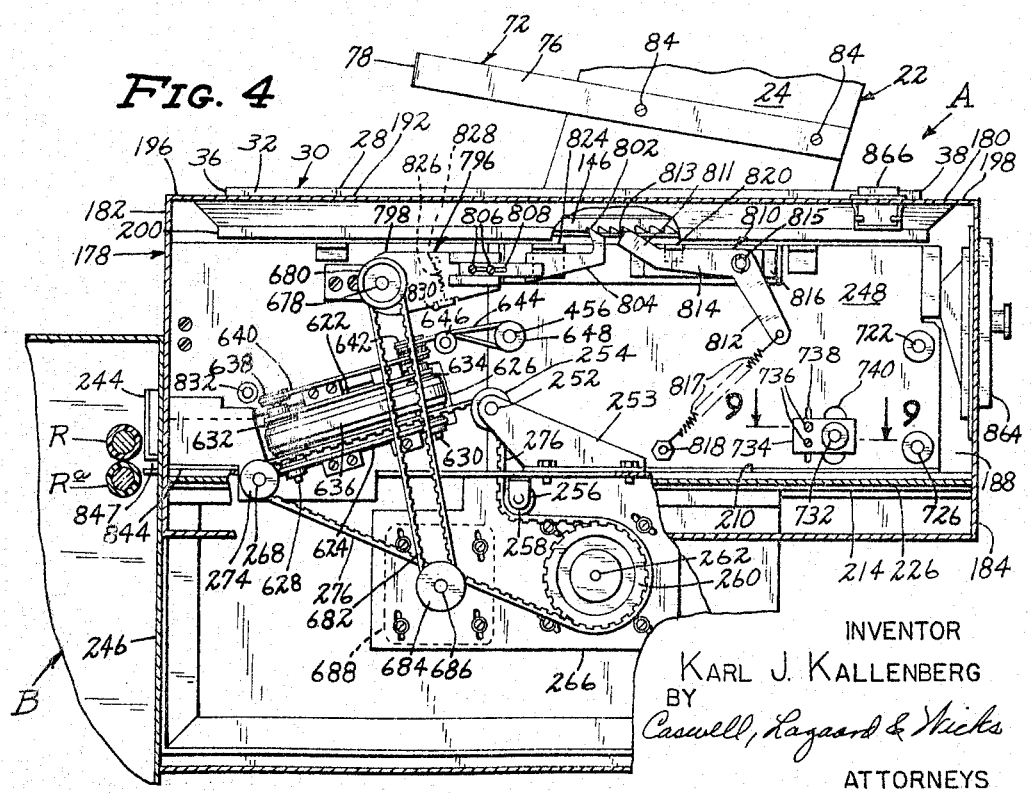
Figure 5:
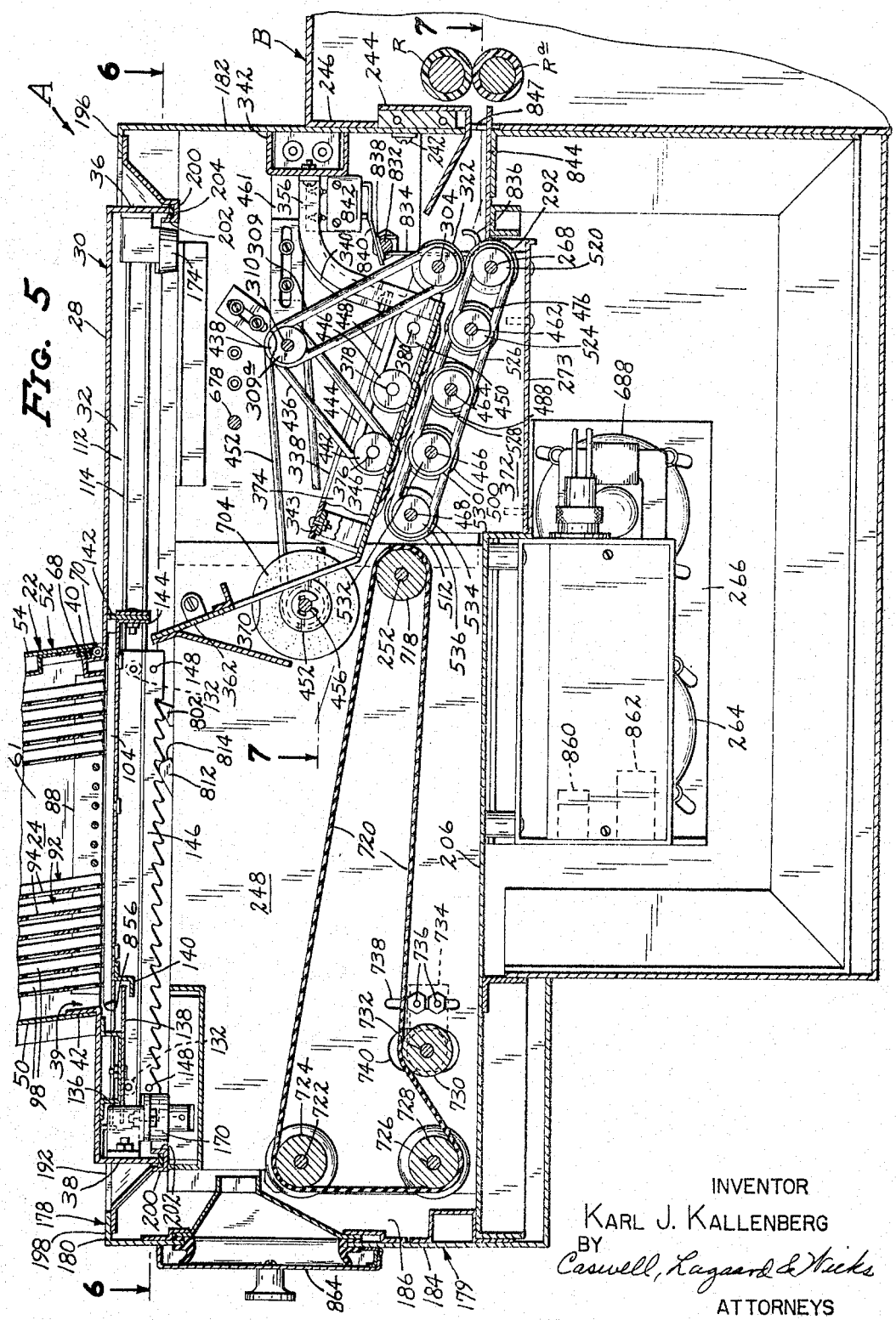
Figure 6:
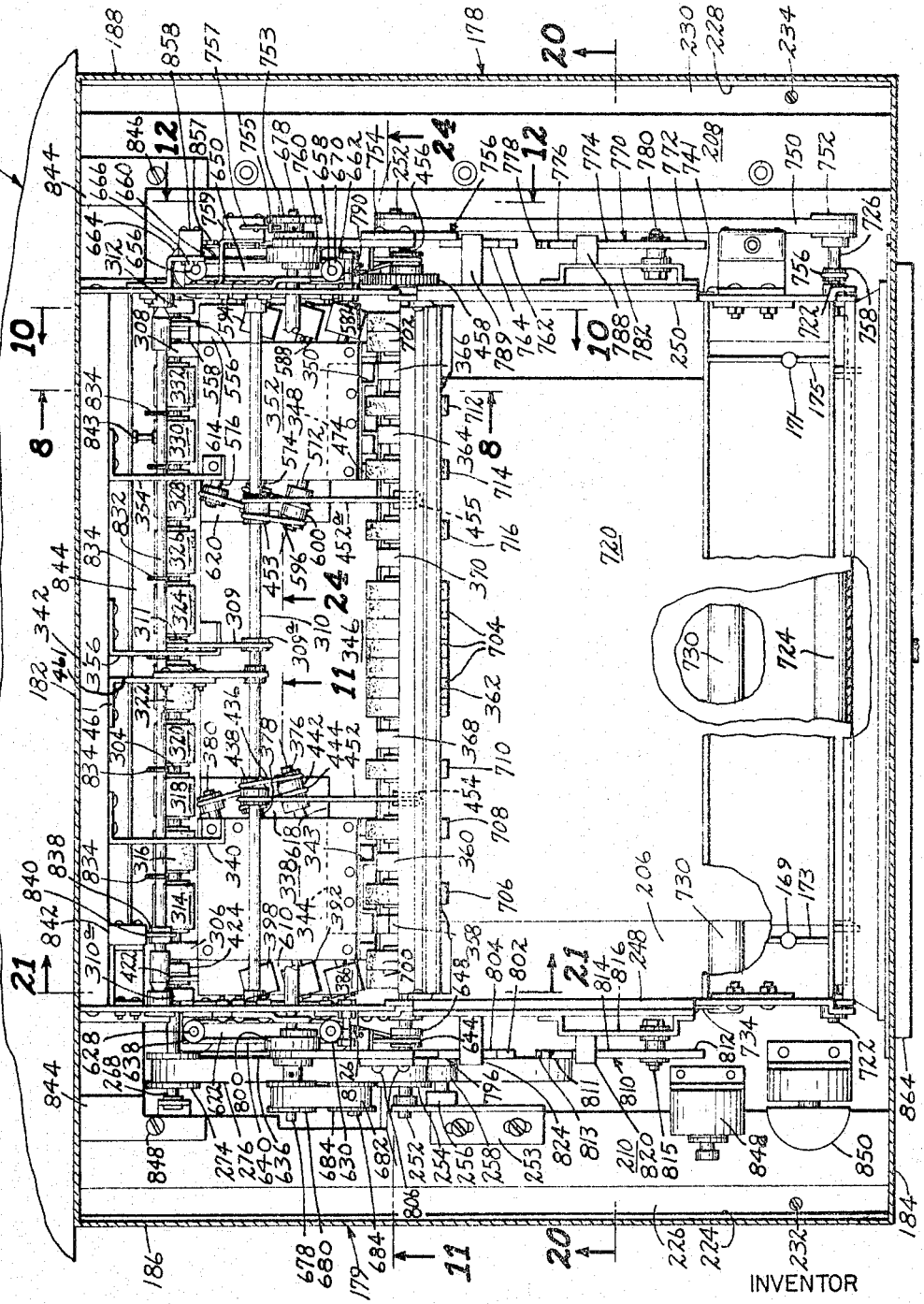
Figure 11:
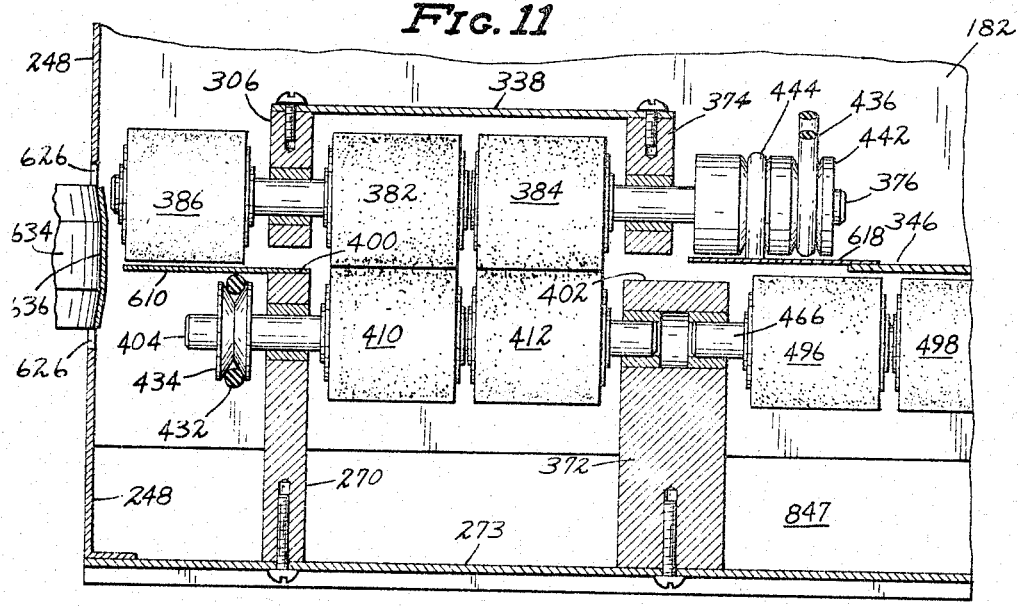
Figure 12:
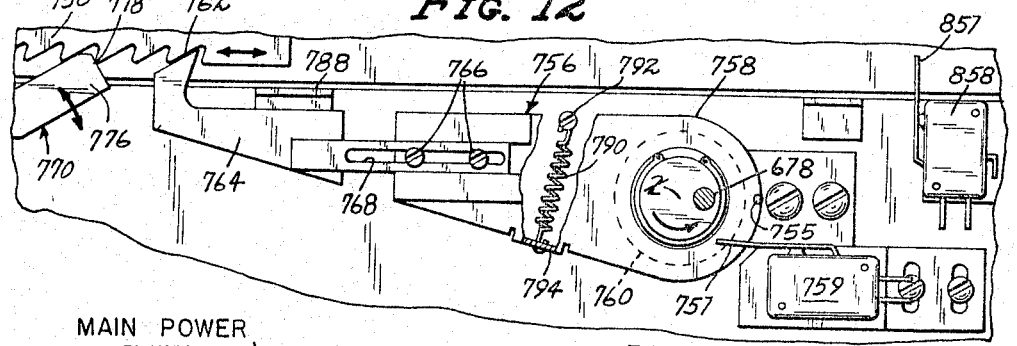
Figure 13:
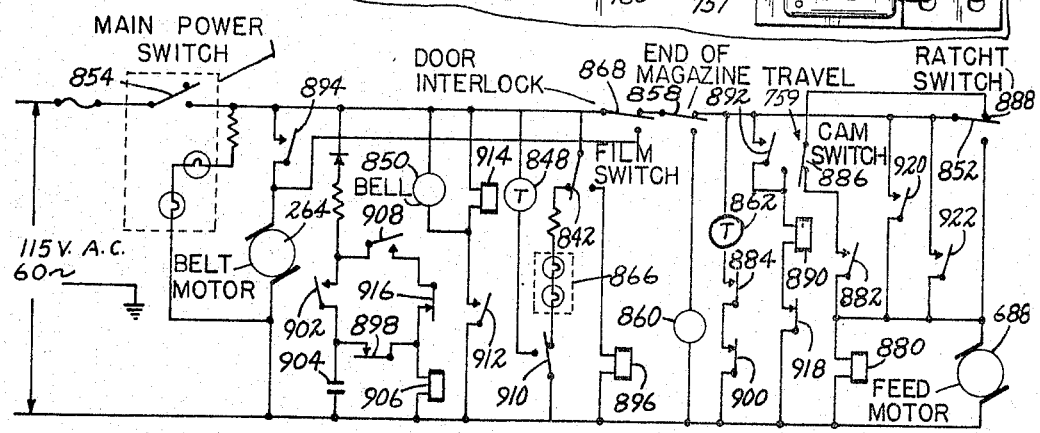
Figure 14:
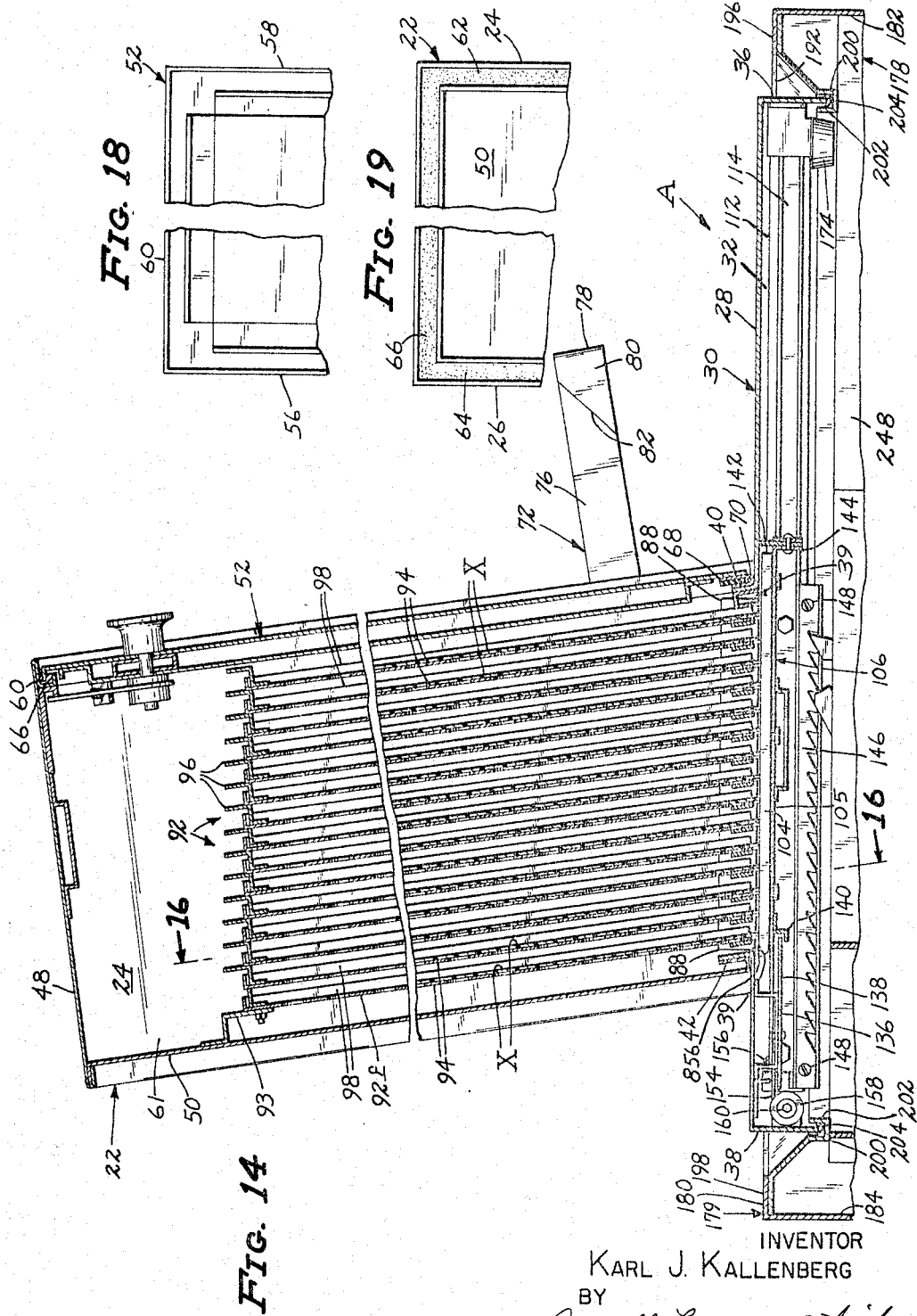
Figure 15:
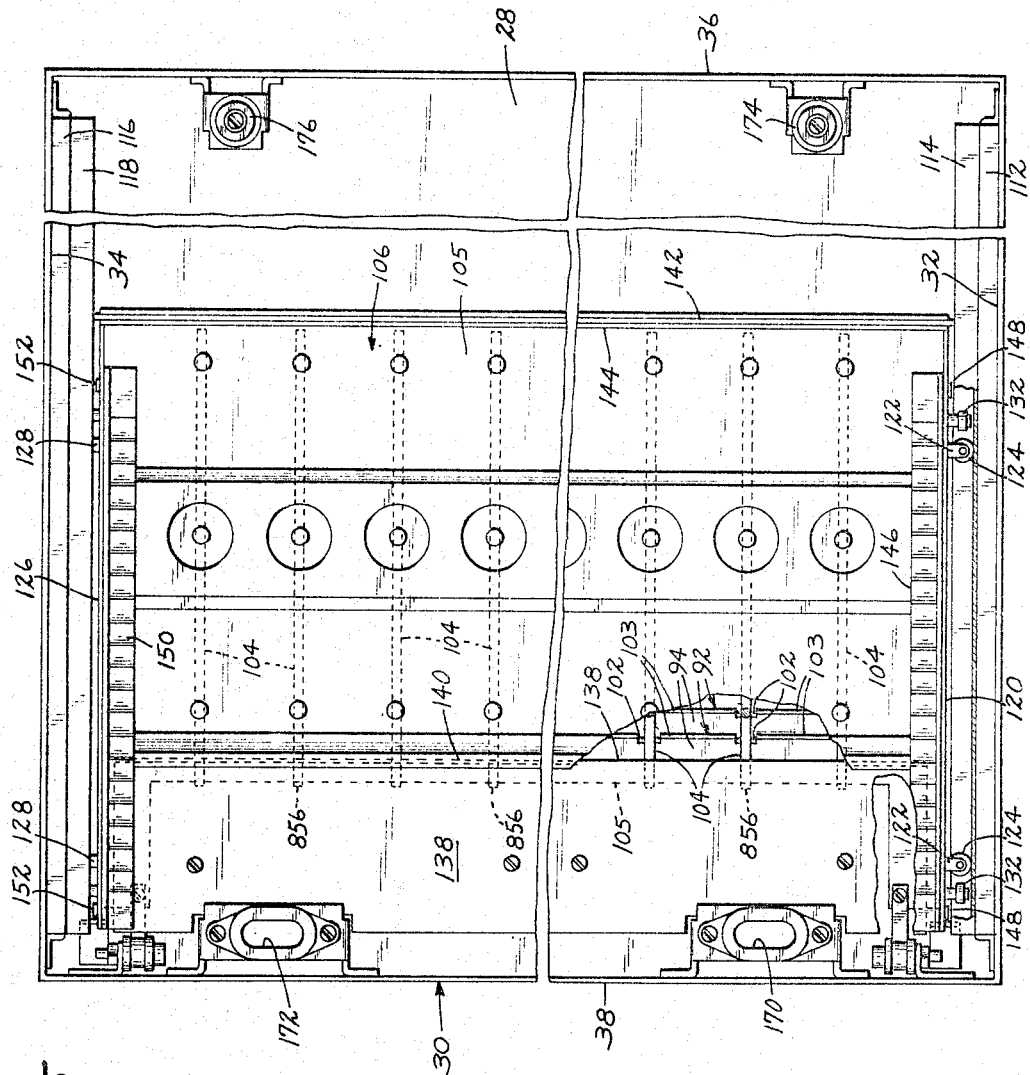

FIGURE 2 is a further perspective view of the device.
FIGURE 3 is a section on the line 3—3 of FIGURE 1.
FIGURE 4 is a section on the line 4—4 of FIGURE 1.
FIGURE 5 is a section on the line 5—5 of FIGURE 1.
FIGURE 6 is a section on the line 6—6 of FIGURE 5.
FIGURE 7 is a section on the line 7—7 of FIGURE 5.
FIGURE 8 is a section on the line 8—8 of FIGURE 6.
FIGURE 9 is a section the line 9—9 of FIGURE 4.
FIGURE 10 is a section on the line 10—10 of FIGURE 6.
FIGURE 11 is a section on the line 11—11 of FIGURE 6.
FIGURE 12 is a section on the line 12—12 of FIGURE 6 with the pawl arm and stop arm in working position.
FIGURE 13 is a wiring diagram for the device.
FIGURE 14 is a section on the line 14—14 of FIGURE 1.
FIGURE 15 is a bottom plan view of the magazine removed from the device.
FIGURE 16 is a section on the line 16—16 of FIGURE 14.
FIGURE 17 is a plan view of the lower portion of a tray, a portion of which is broken away together with portions of the aperture plate.
FIGURE 18 is a plan view of the inside of the magazine door, portions of the same being broken away.
FIGURE 19 is an elevation of a portion of the front of the magazine with the door open and the trays not shown, portions of the same being broken away.
FIGURE 20 is a section on the line 20—20 of FIGURE 6, portions thereof being broken away and other portions not shown for clarity.
FIGURE 21 is a section on the line 21—21 of FIGURE 6 similar to FIGURE 10.
FIGURE 22 is an enlarged fragmentary top plan view of the left side portion of FIGURE 6 rotated one hundred eighty degrees.
FIGURE 23 is an enlarged fragmentary top plan view of the right side portion of FIGURE 6 complementary to FIGURE 22.
FIGURE 24 is a section on the line 24—24 of FIGURE 6 similar to FIGURE 11.
FIGURE 25 is an axial section through one of the rollers showing a typical mounting.
FIGURE 26 is a top plan view of the inclined plate shown in reduced scale and removed from the unit.
FIGURE 27 is a diagrammatic view of the canted rollers and vertical belt showing a film sheet in broken lines carried to the vertical belt by the canted rollers and aligned by the vertical belt.
FIGURE 28 is a view similar to FIGURE 27 showing a film sheet being drawn from an overlapping sheet by virtue of the canted rollers.

*Magazine unit*

Referring to the drawings in detail, the sheet film feeder A includes the magazine unit 22 which includes the parallelly disposed side panels 24 and 26. The lower ends of each of the panels 24 and 26 are formed at an angle obliquely to the parallel edges of the panels and are secured to the horizontal top portion 28 of the magazine base 30. The base 30 also includes the narrow side wall portions 32 and 34 depending from the top 28 and the narrow depending front and rear edge wall portions 36 and 38, respectively. The term "left" and "right" used hereinafter in reference to certain parts are taken from a position facing the front wall portion 36.

The top portion 28 of magazine base 30 is formed with a transverse opening or aperture 39 defined by the front transverse upstanding flange 40, the rear transverse flange 42 and the longitudinal side edges 44 and 46 spaced inwardly from the side wall portions 32 and 34, respectively, particularly FIGURES 1, 5, 14 and 15. The magazine 22 also includes the top portion 48 and the rear wall portion 50. The rear wall 50 is secured to transverse flange 42, FIGURE 5. The front of the magazine is made up of the door 52 including the flat panel portion 54 formed with the inwardly extending light sealing side lip portions 56 and 58, and the upper light sealing lip portion 60, particularly FIGURE 18. The panels 24 and 26 together with the rear wall 50 and the door 52 form a hopper 61 for the film trays hereinafter described. The light sealing lip portions 56, 58 and 60 of the door 52 contact the resilient polyurethane foam strips 62, 64 and 66, respectively, which strips are mounted on the forward edges of the side panels 24 and 26 and the top portion 48, respectively, of the magazine thereby light-sealing the sides and top edge of the door 52 when the same is closed, particularly FIGURES 18 and 19. The lower edge of the door 52 is light sealed by means of the foam strip 68 secured to the door hinge 70 which strip contacts the inner lower surface of the door, FIGURE 14. The door hinge 70 is secured to the transverse flange 40 and the lower edge of the door panel portion 54.

The door 52 is held in a partially open position at rest for easy access to the magazine 22 by means of the brackets 72 and 74 secured to the side panels 24 and 26, respectively. Each of the brackets 72 and 74 includes a substantially horizontal portion 76 which at its front end terminates in a right angle portion 78 which in turn terminates in a right angular stop shoulder portion 80 overlying portion 76. The stop shoulder portion 80 is formed with an angularly disposed edge portion 82 which receives the front surface of the door panel 54 to hold the door 52 substantially in the angularly disposed open position shown in FIGURE 2. The brackets 72 and 74 are secured to the side panels 24 and 26, respectively, by nut-equipped bolts 84 extending through spacers 86.

Secured to the lower inner edges of the side panels 24 and 26 are the anchor bars 88 and 90, respectively, the lower edges of which are substantially in the same plane as the top portion 28 of base 30, particularly FIGURE 16.

Further provided are a multiplicity of film trays 92, FIGURES 14, 15 and 16, each formed of the flat central portion 94 together with the upper horizontal marginal raised edge 96 and the side vertical raised marginal edges 98 and 100 when viewed from the front, FIGURE 15 in particular. The raised marginal upper edge 96 acts as a stop rest for the tray 92 next adjacent and positioned against the same. The flat central portion 94 has formed on the lower edge thereof the multiplicity of spaced notches 102 which are in alignment with a multiplicity of spaced upstanding longitudinal ribs 104 on which the lower edge of the sheet film X rests as will be pointed out hereinafter in detail. The ribs 104 are formed on and extend longitudinally of the platform 105 of the reciprocating aperture plate sheet support 106 hereinafter referred to. The notches 102 form tabs 103 which extend downwardly between ribs 104 whereby a film sheet cannot slip under the lower edge of the portion 94 of the tray, FIGURES 16 and 17.

Secured to the lower edge of each of the vertical raised marginal edges 98 and 100 of a tray 92 are the trunnions 108 and 110 which are mounted in bearing holes formed in the anchor blocks 88 and 90, respectively, thereby supporting the trays and allowing the trays to be pivotally manipulated as explained hereinafter, particularly FIGURE 16.

The rearmost tray 92f is secured to the support 93 secured to the rear wall 50 of the magazine which tray does not have to be pivotally moved out of the hopper 61, for film may be placed in the same with the other trays positioned out of the hopper. The vertical height of the trays 92 is less than that of the side panels 24 and 26 whereby the top edges of the trays are spaced from the top 48 of the magazine.

Secured to the inner surface of the side wall portion 32 of the magazine 22 is the longitudinal bracket 112 to which is secured the channel member 114 and secured to the inner surface of the side wall portion 34 is the bracket 116 to which is secured the channel member 118, particularly FIGURES 15 and 16. The numeral 120 designates a longitudinal flange depending from the outer edge of the aperture plate 106 and extending from the flange 120 are the pair of spaced small horizontal flanges 122. Each of the flanges 122 mounts a small horizontally disposed wheel 124 and the flanges 122 are so positioned that the wheels 124 are positioned within the channel 114 and make rolling contact with the vertical base portion of the channel 114 to control and limit the transverse movement of the aperture tray 106 in its longitudinal reciprocable movement.

The numeral 126 designates a longitudinal flange depending from the other outer edge of the aperture plate 106 and in parallel relation to companion flange 120, and extending from the flange 126 are the pair of spaced small horizontal flanges 128. Each of the flanges 128 mounts a small horizontally disposed wheel 130. The small flanges 128 are so disposed that the wheels 130 are positioned within the channel 118 and make rolling contact with the vertical base portion of the channel 118 to control and limit the transverse movement of the aperture tray 106 in its longitudinal reciprocable movement in conjunction with the companion wheels 124, FIGURES 15 and 16.

Further provided with the tray 106 are a pair of spaced vertically disposed wseels 132 each rotatably mounted on a short shaft connected to the flange 120. The wheels 132 are so positioned that the same travel within the channel 114 and bear upon the lower flange or wall portion of the channel 114 whereby the plate 106 may be reciprocated easily horizontally of the magazine. The plate 106 is restricted in vertical movement also by contact of the wheels 132 with the upper wall portion of the channel 114, particularly FIGURES 15 and 16.

A pair of small vertically disposed spaced wheels 134 are provided which are similar to wheels 132, each of said wheels 134 rotatably mounted on a short shaft connected to flange 126. The wheels 134 are positioned so that the same travel within channel 118 and bear upon the lower flange or wall portion of the channel and act in conjunction with similar wheels 132 for stable longitudinal movement of the tray 106. The wheels 132 and 134 allow longitudinal travel of the plate 106 in the channels 114 and 118 but limit the plates' vertical movement while the horizontally disposed wheels 124 and 130 limit transverse movement of the tray while acting in conjunction with wheels 132 and 134.

Secured to the underside of the top portion 28 of magazine base 30 is the bracket 136 to which is secured the horizontal plate member 138 which extends transversely of the base 30 and spaced therefrom adjacent the aperture 39, particularly FIGURES 14 and 15. The aperture plate 106 has secured to the underside thereof adjacent the rear end, the transverse right angular lip member 140, FIGURES 14 and 15, which forms a channel which receives the forward edge of the plate member 138 to thereby form a light lock at the rear edge of the aperture plate 106 adjacent the rear edge of the aperture 39 when the aperture plate is at a fully closed rearward position.

A light lock at the front edge of the aperture plate 106 is provided by means of the transverse felt strip 142 secured to the flange 144 formed on the entire forward edge of the aperture plate. The strip 142 is so positioned that the upper edge thereof maintains contact with the under surface of the top 28 of magazinne 30, FIGURES 5 and 14 particularly.

The numeral 146 designates a first rack which extends longitudinally of the plate 106 at the outer under edge thereof, the same being secured to the flange 120 by means of the nut-equipped bolts 148, particularly FIGURES 14 and 15, also FIGURES 4 and 5. An identical second rack 150 is provided which also extends longitudinally of the plate 106 at the opposite outer edge thereof, the same being secured to the flange 126 by means of the nut-equipped bolts 152.

The aperture plate 106 is normally urged in a rearward position which closes off the aperture 39 by means of the flat coil spring 154 secured at its outer free end to the rear end of the platform 105 of aperture plate 106 by means of the small bolt 156 with the spring wound upon a roller 158 mounted on the shaft 160, particularly FIGURE 15, together with a second flat coil spring 162 secured at its outer free end to the rear end of the platform 105 of plate 106 by means of the small bolt 164 with the spring wound upon a roller 166 mounted on the shaft 168. The two coiled springs 154 and 162 working in unison urge the aperture plate in a constant position normal to the longitudinal axis of the magazine.

Secured to the rear edge wall 38 of magazine base 30 are the pair of spaced socket members 170 and 172 which are used to position the magazine 22, as will be hereinafter pointed out, particularly FIGURES 5 and 15. The socket members 170 and 172 also serve as small foot members on which the magazine rests when removed from the base in conjunction with the pair of front foot members 174 and 176. It will be seen that with the hopper 61 angularly disposed to the magazine base 30 the trays 92 will lie at rest one upon the other in the hopper. Also, the door 52 rests at an angle against the brackets thereby allowing trays to lie at rest against the same when the trays are pivotally moved out of the hopper. As will be seen, the magazine 22 is removably mounted on the base 178. In addition, the angular disposition of the trays 92 allows the film to drop by gravity and strike the main belt, hereinafter described, at an angle less than perpendicular which aids in the pickup of the sheet film by the belt.

*Base unit*

Further provided is the base unit 178 which mounts the magazine 22 and in which is housed mechanism for transporting and feeding sheet film to a processor B which film has been transferred from the magazine. The base unit 178 includes the housing 179 which includes the partial top 180, the front wall 182, the rear wall 184, the side wall 186 and the opposing side wall 188. The top wall 180 is peripheral in nature and includes the narrow side portions 192 and 194, the narrow front and rear portions 196 and 198, respectively. Depending from the top portion 192, 194, 196 and 198 is the marginal channel formation 200 which defines a rectangular opening 202 in the top 180 of the base 178, the opening 202 being closed off by the magazine unit 22, particularly FIGURES 5 and 14.

The channel formation 200 has positioned in the bottom thereof the resilient strip of material 204 upon which the lower edges of the narrow wall portions 32, 34, 36 and 38 of the magazine rest when the magazine 22 is in operative position on the base 178. The engagement of the wall portions of the magazine with the resilient strip 204 provides a light lock at the edge thereof between the magazine and the base 178 and also a cushion mounting for the magazine.

Further provided is the main flat horizontal base support member 206, particularly FIGURE 20, and secured to the outer longitudinal side edges thereof are the elongated flange members 208 and 210 having the offset elongated lip portion 212 and 214, respectively. The film processing machine B has formed as part thereof the elongated and longitudinally extending brackets 216 and 218, particularly FIGURE 20, which have the upper horizontal flange portions 220 and 222, respectively. The main base 206 is supported by positioning the flange 208 on the flange 220 of bracket 216 and the flange 210 on the flange 222 of the bracket 218. The side wall 186 of the base 178 has secured to the inner surface thereof the angle member 224 including the horizontal leg portion 226. The side wall 188 has secured to the inner surface thereof the angle member 228 including the horizontal leg portion 230.

The base housing 179 is positioned upon and over the base 206 in operative position as shown in FIGURES 1 and 2 by placing leg portions 226 and 230 of brackets 224 and 228, respectively, upon lip portions 214 and 212, respectively, of angle members 224 and 228, respectively, while nut-equipped bolts 232 and 234 aid in the securing of the housing in position. To further secure the housing 179 in position the front wall 182 is formed with a pair of spaced slots 236 and 238 at the lower edge thereof, particularly FIGURE 20. The slots 236 and 238 engage bolts 240 and 242, respectively, said bolts being secured in the horizontal bar member 244 mounted on the wall 246 of the processor machine B, FIGURES 5, 8 and 20 in particular. With the bolts 240 and 242 drawn up the housing 178 is securely held in the correct position relative to the base 206 together with elements thereon and processor B.

Further provided is the right vertical support wall 248 secured at its lower edge to the top of the main base 206 adjacent flange 210 and the left vertical support wall 250 also secured at its lower edge to the main base 206 adjacent flange 208 in spaced relation to wall 248, particularly FIGURE 20.

The numeral 252 designates a main transverse drive shaft which is rotatably mounted in bearings at each end secured in the support walls 248 and 250 and bracket 253 mounted on flange 210. Secured at one end of the shaft 252 is the timing belt pulley 254, and mounted on the bracket 256 adjacent thereto is the idler pulley 258, FIGURES 4, 6 and 7. Further provided is the main drive timing belt pulley 260 mounted on the shaft 262 of belt motor 264 mounted on depending plate 266 connected to the underside of main base 206, FIGURES 4, 7 and 20. Also provided is the lower forward shaft 268 rotatably mounted on one end of the forward end of an inclined lower outer bearing block support 270 and at the other end on the forward end of inclined lower outer bearing block support 272, particularly FIGURES 4, 6, 7 and 8. The supports, 270 and 272 are mounted on transverse plate 273 which plate is secured to support walls 248 and 250, FIGURES 5, 8, 10 and 21. Mounted on the outer end of lower forward shaft 268 is the lower forward shaft timing pulley 274, FIGURES 4, 6, and 7. A timing belt 276 is provided which is positioned over main shaft pulley 254, forward shaft pulley 274, motor pulley 260 and under idler pulley 258. Thus, when belt motor 264 is started shafts 252 and 268 are rotated through belt 276, and the belt is maintained at proper tension by means of the idler pulley 258 which is adjustable.

The lower forward shaft 268 is further supported substantially centrally thereof by means of the vertical bearing block 278, FIGURE 7, mounted on the transverse plate 273. Positioned on the shaft 268 adjacent the outer end is the lower outboard roller 280 and at the opposite end of the shaft the lower outboard roller 282, particularly FIGURES 6 and 7. The lower forward shaft 268 also mounts lower forward resilient transport rollers 284, 286, 288, 290 and 292 in spaced relation between shaft support 270 and the central bearing block 278. The shaft 268 also mounts further lower forward resilient transport rollers 294, 296, 298, 300 and 302 in spaced relation between the central bearing block 278 and shaft support 272. All of the lower forward rollers are made of a soft resilient material such as polyurethane foam, and such rollers, while freely mounted on the shaft, provide a gentle friction tendency drive for transporting the sheet film.

Further provided is an upper forward shaft 304 companion to lower forward shaft 268 and which overlies the same. The upper forward shaft 304 is mounted at one end in the forward end of the elongated upper right outer bearing block 306, particularly FIGURES 5, 6, 10 and 21, and at the other end in the forward end of the elongated upper outer bearing block 308. The upper forward shaft 304 is rotatably driven by means of the belt 309 positioned on the pulley 309a on jack shaft 310 and pulley 311 mounted on shaft 304, particularly FIGURES 5 and 6. The jack shaft 310 is driven by means hereinafter described. The upper forward shaft 304 has positioned thereon adjacent one end thereof the upper outboard resilient transport roller 310a and at the opposite end of the shaft the upper outboard resilient transport roller 312, particularly FIGURES 6, 22 and 23. The upper forward shaft 304 also mounts spaced upper forward resilient transport rollers 314, 316, 318, 320 and 322 which overlie companion lower rollers 284–292, respectively. The shaft 304 also mounts further upper spaced forward resilient transport rollers 324, 326, 328, 330, 332 which overlie companion lower rollers 294–320, respectively. All of the upper forward rollers are also made of a soft resilient material such as polyurethane foam, and such rollers, while freely mounted on the shaft, provide a gentle friction tendency drive for transporting the sheet film. All of the rollers on shafts 268 and 304 are positioned between pairs of clips fixed on the shaft such as 334 and 336 shown in FIGURE 25. The rollers on shaft 268 and the companion rollers on shaft 304 are a pinch type, the same being pressed together under approximately 1/16 inch of compression.

The upper outer right bearing block 306 is supported by the same being secured to the underside of plate 338, FIGURES 5 and 6, and is inclined downwardly towards wall 182. Plate 338 is further connected to and supported by cantilever arm 340 connected to the forward transverse frame member 342 which is connected at its outer ends to supports 248 and 250, FIGURES 5 and 6. The plate 338 is further supported by means of the U-shaped brace 343, FIGURES 5 and 6, connected to the plate 338 and the extension plate portion 344 of central inclined plate 346. Inclined plate 346 also includes extension plate portion 348 on which is secured U-shaped brace 350 on which inclined plate 352 is secured and partially supported, upper bearing block 308 being secured to the underside of plate 352 and partially supported thereby. The plate 352 is further supported by the cantilever arm 354 connected thereto and to transverse frame member 342. The plate 352 is inclined downwardly towards wall 182.

The central inclined plate 346 is secured in position at its forward edge by means of the cantilever arm 356 connected thereto and to transverse frame member 342. Inclined plate 346 is further supported by means of the spaced finger portions 358 and 360 extending from the extension portion 344 of the plate and connected to the central transverse frame member 362 together with the spaced finger portions 364 and 366 extending from extension plate portion 348 and connected to the transverse frame member 362, FIGURES 5 and 6. The central inclined plate 346 is supported centrally thereof by the spaced finger portions 368 and 370 extending from the plate 346 and connected to the central transverse frame member 362.

The numeral 372 designates a lower right inner bearing block which is fixedly mounted on the transverse plate 273, FIGURE 5. The upper inner bearing block 374 which overlies block 372 is secured to the underside of the plate 338, particularly FIGURE 11. It will be seen that upper outer bearing block 306 overlies lower outer bearing block 270. The inclined upper bearing blocks 306 and 374 have parallel upper and lower edges and journalled in said bearing blocks are the spaced short roller shafts 376, 378 and 380, FIGURES 5, 6 and 11. The shafts 376, 378 and 380 are canted relative to the longitudinal axis of the base 178 and the blocks 306 and 374.

Mounted on the short canted shaft 376 are the spaced resilient upper rollers 382 and 384 and mounted on the outer end of shaft 376 is the outboard roller 386. The short canted shaft 378 mounts the upper spaced resilient rollers 388 and 390 and mounted on the outer end of the shaft 378 is the outboard roller 392. Further, the short canted shaft 380 mounts the upper spaced resilient rollers 394 and 396, and mounted on the outer end of the shaft 380 is the outboard roller 398. The outer right lower bearing block 270 is formed with the upper edge 400 inclined downwardly towards front wall 182, particularly FIGURES 7 and 21, and parallel to the lower edge of upper outer bearing block 306. The inner lower bearing block 372 is also formed with the upper edge 402 inclined downwardly towards front wall 182 and positioned in the same plane as upper edge 400 of block 270. Journalled in the lower bearing blocks 270 and 372 are the spaced lower right short roller shafts 404, 406 and 408 which are canted relative to the longitudinal axis of the base 178 and the bearing blocks 270 and 372.

Mounted on the short canted shaft 404 are the lower spaced resilient rollers 410 and 412. Mounted on the short canted shaft 406 are the spaced resilient lower rollers 414 and 416 and mounted on the short canted shaft 408 are the lower spaced resilient rollers 418 and 420. It will be seen that the upper rollers 382 and 384 overlie companion lower rollers 410 and 412, respectively, and upper rollers 388 and 390 overlie companion lower rollers 414 and 416, respectively. In addition, upper rollers 394 and 396 overlie companon lower rollers 418 and 420, respectively. The upper bank of canted rollers make slight pressure contact with the lower bank of canted rollers to provide transport and guidance for the sheet film carried to the same as will be hereinafter described.

The right lower bank of first canted rollers is driven by means of a small rubber belt 422 positioned on the pulley 424 mounted on the lower forward shaft 268 and double pulley 426 mounted on the outer end of canted shaft 408. The belt 422 rides against vertical roller 427. A rubber belt 428 is positioned on double pulley 426 and over double pulley 430 mounted on the outer end of canted shaft 406. A further rubber belt 432 is positioned on double pulley 430 and over single pulley 434 mounted on the outer end of canted shaft 404. Thus, as the lower forward shaft 268 is rotated, all the lower canted rollers 410–420 are thereby rotated. The lower forward shaft 268 is rotated by the belt 276 as heretofore set forth.

The right upper bank of first canted rollers 382–396 is driven by means of a small rubber belt 436 positioned on the double pulley 438 mounted on the driven jack shaft 310 and on the double pulley 442 mounted on the inner end of canted shaft 376. A belt 444 is mounted on the double pulley 442 and on the double pulley 446 mounted on the inner end of canted shaft 378. A further belt 448 is mounted on double pulley 446 and on the single pulley 450 mounted on the inner end of canted shaft 380. Thus, as the jack shaft 310 is rotated by means hereinafter described all of the right upper bank of canted rollers 382, 384, 388, 390, 394 and 396 are thereby rotated.

Jack shaft 310 is rotated in part by means of a first belt 452 positioned on the double pulley 438 mounted thereon and on pulley 454 mounted on the rear transverse shaft 456 mounted at its ends on the upright support walls 248 and 250, particularly FIGURE 6. The transverse shaft 456 is driven by means of the gear 458 mounted on the outer left end thereof which is driven by the gear 460 mounted on the outer end of shaft 252, shaft 252 being driven by timing belt 276 as heretofore set forth, particularly FIGURES 3 and 4. The jack shaft 310 is also rotated by means of a second belt 452a similar to belt 452 and positioned on the double pulley 453 mounted thereon and on pulley 455 mounted on the rear transverse shaft 456. The jack shaft 310 is supported centrally by means of the bracket 461 connected to the shaft and to the forward transverse frame member 342, particularly FIGURE 6.

Further provided is a central lower bank of transport rollers which includes the spaced shafts 462, 464, 466 and 468, the ends of each of which are journalled in the inner lower bearing block 372 and the inner lower right bearing block 470, particularly FIGURES 7 and 11. Shaft 462 mounts the resilient transport rollers 472, 474, 476, 478, 480 and 482. Shaft 464 mounts the resilient transport rollers 484, 486, 488, 490, 492 and 494 while shaft 466 mounts the resilient transport rollers 496, 498, 500, 502, 504 and 506. Shaft 468 mounts resilient rollers 508, 510, 512, 514, 516 and 518. The inclined plate 346 overlies the transport rollers 472–518 and is spaced approximately 1/16 inch therefrom. Thus, the rollers transport film sheets in conjunction with the plate 346 due to the proximity of the plate to the rollers. The shafts 462–468 are driven by means of the following with particular reference to FIGURE 5. A pulley 520 is secured to lower forward shaft 268 and on which rubber belt 522 is positioned. Belt 522 is also positioned on double pulley 524 mounted on shaft 462 and belt 526 is positioned on pulley 524 and also on double pulley 528 mounted on shaft 464, while belt 530 is also mounted on double pulley 528 and on double pulley 532 mounted on shaft 466. In addition, belt 534 is mounted on single pulley 536 mounted on shaft 468. Thus, as the forward lower shaft 268 is rotated, the shafts 462–468 together with the rollers thereon are thereby rotated in unison with lower right bank rollers 410–420, particularly FIGURE 7. The inclined plate 346 overlies the lower central bank of rollers 472–518 and is spaced approximately 1/16 inch above the same whereby the rollers transport film directed to the same.

The inner lower right bearing block 470 is substantially identical to inner lower block 372 and has the upper edge 473 which is inclined downwardly towards wall 182 of base 178 and fixedly secured to transverse plate 273, and the inner upper right bearing block 474 which overlies rollers block 470 is secured to the underside of the inclined plate 352, particularly FIGURES 6 and 24. The upper left inner bearing block 474 is identical to upper right inner bearing block 374, FIGURES 11 and 24.

Further provided are the lower left short shafts 538, 540 and 542 which are journalled in the lower left inner and outer bearing blocks 470 and 272. The shaft 538, 540 and 542 are canted relative to the longitudinal axis of the base 178 and the bearing blocks 470 and 272. Mounted on the short canted shaft 538 are the spaced resilient lower canted rollers 544 and 546 and mounted on the short canted shaft 540 are the lower spaced resilient canted rollers 548 and 550. Additional lower spaced resilient canted rollers 552 and 554 are mounted on short canted shaft 542.

The left lower bank of canted rollers mounted on bearing blocks 470 and 272 is driven by means of a small rubber belt 556 positioned on pulley 558 mounted on the lower forward shaft 268 and the double pulley 560 mounted on the outer end of canted shaft 538. The belt 556 rides on vertical roller 561. A rubber belt 562 is positioned on double pulley 560 and also over double pulley 564 mounted on the outer end of canted shaft 540. A further rubber belt 566 is positioned on double pulley 564 and single pulley 568 mounted on the outer end of canted shaft 542. Thus, as the lower forward shaft 268 is rotated, all the lower left canted rollers 544–554 are thereby rotated in unison with central lower rollers 472–518 and lower right rollers 410–420.

The numeral 474 designates an upper inner left bearing block, FIGURE 24, substantially identical to upper inner right bearing block 374. Bearing block 474 is secured to the underside of inclined plate 352 and overlies lower inner left bearing block 470. Further provided is the aforementioned upper outer left bearing block 308 which overlies lower outer left bearing block 272. The inclined right upper bearing blocks 474 and 308 have journalled therein the spaced short roller shafts 572, 574 and 576 all of which are canted relative to the longitudinal axis of the base 178 and the bearing blocks 474 and 308.

Mounted on the canted shaft 572 are the upper resilient rollers 578 and 580 and mounted on the outboard end of shaft 572 is the outboard roller 582. The canted shaft 574 mounts the upper resilient rollers 584 and 586 and on the outer end thereof the outboard resilient roller 588. In addition, the canted shaft 576 mounts the resilient rollers 590 and 592 together with the outboard resilient roller 594 mounted on the outer end thereof.

Referring particularly to FIGURES 6, 22 and 24, the left upper bank of second canted rollers 578–590 is driven by means of a small rubber belt 596 positioned on the double pulley 453 mounted on the jack shaft 310 and on the double pulley 600 mounted on the inner end of canted shaft 572. A rubber belt 602 is mounted on the double pulley 600 and also on double pulley 604 mounted on the inner end of shaft 574. A further rubber belt 606 is mounted on the double pulley 604 and also on single pulley 608 mounted on the inner end of shaft 576. Thus, as the jack shaft 310 is rotated all of the upper canted shafts 572, 574 and 576 are thereby rotated together with the rollers thereon, and said rollers are rotated in unison with lower left bank canted rollers 544–554. It will be noted that the upper left bank canted rollers 578–592 overlie lower left bank of second canted rollers 544–554, respectively, and are in slight pressure contact as in the case of the upper and lower right banks of canted rollers.

With reference to the right bank of first upper and lower canted rollers there is provided the flat shield plate 610, FIGURES 11 and 21, which is secured to the top edge 409 of lower right outer bearing block 270 with the front end terminating adjacent the lower forward shaft 268 and the rear end formed with the downwardly extending arcuate formation 612. The shield plate 610 overlies the pulleys 426, 430 and 434, FIGURES 7, 11 and 21, thereby preventing sheet film coming to rollers 410 and 412 from engaging pulleys 426, 430 and 434 and it also aids in transporting the sheet film in conjunction with the outboard rollers 386, 392 and 398 which overlie and are in slight contact with the shield 610.

With reference to the left bank of second upper and lower canted rollers there is provided a second shield plate 614 having arcuate rear end 616, FIGURES 10 and 24 particularly, which is secured to the top edge 472 of lower left outer bearing block 272 and which is identical to shield plate 610. The shield plate 614 prevents sheet film from engaging pulleys 560, 564 and 568 and acts in conjunction with overlying rollers 582, 588 and 594 which are in slight contact with the sheld 614 which aids in transporting sheet film. In summary, there is disclosed a left bank of upper and lower first canted rollers and a right bank of upper and lower second canted rollers.

Further provided are the shield plates 618 and 620 which are secured at the rear ends thereof to the extension portions 344 and 348, respectively, of the central inclined plate 346. The shield plate 618 underlies the pulleys 442, 438 and 450 to prevent sheet film from engaging the same and the shield 618 acts in conjunction with the underlying rollers 472, 484 and 496 for direction and transporting of sheet film. The shield plate 620 underlies the pulleys 608, 453 and 600 to prevent sheet film from engaging said pulleys, and the shield 620 acts in conjunction with underlying rollers 482, 494 and 506 for direction and transporting of sheet film, the pulleys being in slight contact with the shield plate.

With particular reference to FIGURES 4, 7, 11 and 20 there is provided the spaced upper and lower right brackets 622 and 624, respectively, which are connected to and extend outwardly from the right support wall 248. The brackets 622 and 624 are parallely disposed with upper bracket 622 at the upper edge of rectangular opening 626 of wall 248 and lower bracket 624 at the lower edge of opening 626. The angular disposition of brackets 622 and 624 relative to the horizontal axis of the base 178 is substantially that of the plate shield 610. The brackets 622 and 624 have mounted thereon the spaced shafts 628 and 630 and mounted thereon are the crowned rollers 632 and 634, respectively, which mount the first vertically disposed flat belt 636. The inner vertical flat portion of belt 636 is positioned slightly inwardly of the vertical wall 248 at opening 626. Mounted on the upper end of shaft 628 is pulley 638 on which is mounted rubber belt 640. Rubber belt 640 is mounted on double pulley 642 mounted on the upper end of shaft 630. Also mounted on double pulley 642 is rubber belt 644 which is also mounted over idler roller 646 and on pulley 648 mounted on driven shaft 456 hereinbefore described. Thus, as shaft 456 is driven vertical flat belt 636 is driven through the pulleys and belts described.

The linear speed of travel of the belt 636 is greater than the linear speed of travel of the sheet film carried to the belt for the reason hereinafter set forth, and the speed of belt 636 is determined by the diameter of pulleys 638 and 642 and the speed of rotation thereof.

With particular reference to FIGURES 3, 7, 20 and 24 there is also provided the spaced upper and lower left brackets 650 and 652, respectively, which are connected to and extend outwardly from the left support wall 250. The brackets 650 and 652 are substantially identical in structure to brackets 622 and 624 and are likewise parallely disposed with upper bracket 650 at the upper edge of rectangular opening 654 of wall 250 and lower bracket 652 at the lower edge of opening 654. The angular disposition of brackets 650 and 652 relative to the horizontal axis of the base 178 is substantially that of plate shield 614. The brackets 650 and 652 have mounted thereon the spaced shafts 656 and 658 and mounted thereon are the crowned rollers 660 and 662, respectively, which mount the second vertically disposed flat belt 664. The inner vertical flat portion of belt 664 is positioned slightly inwardly of the vertical wall 250 at opening 654. Mounted on the upper end of shaft 656 is the pulley 666 on which is mounted rubber belt 668. The belt 668 is mounted on double pulley 670 mounted on the upper end of shaft 658. Also, mounted on double pulley 670 is rubber belt 672 which is also mounted over idler roller 674 and on pulley 676 mounted on driven shaft 456. Thus, as shaft 456 is driven vertical flat belt 664 is driven through the pulleys and belts described. The linear speed of travel of the belt 664 is greater than the linear speed of travel of the sheet film carried to the belt for the reason hereinafter set forth, and the belt speed is determined by the diameter of the pulleys 676 and 670 and the speed of rotation thereof.

Further provided is the upper transverse shaft 678 rotatably mounted on the vertical support walls 248 and 250, and mounted on the outer right end of shaft 678 is the gear pulley 680 which has mounted thereon the timing belt 682 which in turn is mounted on the gear pulley 684. Gear pulley 684 is mounted on motor shaft 686 of feed motor 688 mounted on the inner face of depending plate 266. Thus, shaft 678 is driven by means of motor 688 through belt 682.

Mounted on the rear transverse shaft 456 are a multiplicity of spaced pick-up transport resilient rollers, particularly FIGURE 6, including right outboard transport roller 700 and left outboard transport roller 702 together with the central unit of transport rollers 704. Also mounted on shaft 456 are the right spaced transport rollers 706, 708 and 710 and the left spaced transport rollers 712, 714 and 716, the shaft 456 being directly driven by the gear 458 hereinbefore described.

The numeral 718 designates a roller mounted on the shaft 252 upon which is positioned the main wide transport belt 720, particularly FIGURES 3, 5, 7 and 8. Further provided is an upper rear transverse belt shaft 722, the outer ends of which are journalled in the vertical support walls 248 and 250. Secured on the shaft 722 is the roller 724 over which the belt 720 is positioned. The shaft 722 is positioned higher vertically than shaft 252 whereby the upper belt portion between shafts 722 and 252 inclines downwardly from shaft 722 to 252 as an aid in transporting the film. Also provided is lower rear transverse belt shaft 726 on which is secured roller 728, the shaft 726 being journalled at its ends in the support walls 248 and 250 and positioned directly below shaft 722, particularly FIGURE 5.

The main transport belt 720 is also positioned over roller 728 and also over transverse belt tension roller 730 mounted on shaft 732. The shaft 732 is mounted at its right end on the small plate 734 adjustably secured to support wall 248 by means of the nut-equipped bolts 736 extended through the vertical slot 738 formed in wall 248, particularly FIGURES 4, 5 and 9. The right end of shaft 732 extends through the elongated opening 740 formed in the support wall 248. The shaft 732 is mounted at its left end on the small plate 741, particularly FIGURE 3, adjustably secured to support wall 250 by means of the nut-equipped bolts 742 extended through the vertical slot 744 formed in wall 250. The left end of shaft 732 extends through the elongated opening 746 formed in the support wall 250.

The lower rear transverse belt shaft 726 is driven by the toothed timing belt 750, particularly FIGURE 3, positioned on the pulley 752 secured to the outer end of the shaft 726 and also positioned on the pulley 754 mounted on the outer end of the main transverse drive shaft 252 adjacent gear 460 also mounted on the end of shaft 252. The gear 458 is driven by the gear 460 and gear 460 is driven as heretofore set forth, particularly FIGURE 3. The upper rear transverse belt shaft 722 is driven by means of the belt 757 mounted on the small pulley 758 mounted on shaft 722 and a small pulley 758a mounted on shaft 726 inwardly of and adjacent pulley 752, particularly FIGURES 3 and 6. The longitudinal axis of the base 178 is considered as extending from the front wall 182 to the rear wall 184.

*Pawl arm and stop assembly*

Further provided is the left pawl arm 756, particularly FIGURES 3, 6 and 12, which includes the semi-circular base portion 758 on which is secured the disc member 760. The disc member 760 provides additional bearing surface to base portion 758 and is positioned so that its center is in alignment with the center of the radii of the semi-circular base portion 758. A hole is formed through said disc member 760 and base portion 758 which is offset from the common center "x" of the base portion 758 and the disc member 760 and in which the upper transverse shaft 678 is mounted thereby providing an eccentric. As a result, rotation of the shaft 678 produces linear movement of the pawl 762 formed on the outer end portion 764 of the arm 756. The outer end portion 764 of arm 756 is adjustably connected to the base portion 758 by means of the nut-equipped bolts 766 threadedly engaging the base portion 758 through the slot 768 of the outer end portion 764.

Also provided is a timing disc 753 mounted on the outer end of shaft 678 and extending inwardly from and at a right angle to the disc adjacent the outer periphery thereof is the pin 755 which engages the spring arm 757 of cam switch 759, particularly FIGURES 6, 3 and 12.

The numeral 770 designates a left stop arm for rack 150 including the arm portions 772 and 774 joined at the inner ends to form an obtuse angle arm, and formed at the outer end of the arm portion 774 is the upturned stop 776 which presents the outward stop shoulder edge 778, particularly FIGURES 3, 6 and 12. The stop arm 770 has a bearing hole formed therethrough at the juncture of the arm portions 772 and 774 and the same is pivotally mounted on the pin 780 secured to and extending horizontally from the bracket 782 secured to the upright support wall 250. The stop shoulder edge 778 of arm 770 is urged upwardly so that it will engage the teeth of rack 150 by means of the coil spring 784 connected to the outer end of stop arm portion 772 and pin 786 extending from support wall 250. The upper limit of travel of arm portion 774 of stop arm 770 is determined by the horizontal stop flange 788 extending outwardly from bracket 782 connected to wall 250. The upper limit of travel of left pawl arm 756 is determined by the horizontal stop flange 789, and the pawl arm 756 is normally urged upwardly by means of the coil spring 790 secured to pin 792 which extends from support wall 248 and also secured to the ear 794 formed on the lower edge of pawl arm 756, particularly FIGURE 12. The left pawl arm 756 engages the teeth of rack 150 of the magazine 22 to actuate the rack and thereby move the aperture plate 106 as will be hereinafter explained.

A companion right pawl arm 796 is provided, particularly FIGURES 4 and 6, which is substantially identical in form and operation to left pawl arm 756 except that it is mounted on support wall 248 and engages rack 146 of the magazine 22 to also actuate aperture plate 106. The right pawl arm 796 includes the semi-circular base portion 798 on which is secured the disc member 800. The disc member 800 provides additional bearing surface to base portion 798 and is positioned so that its center is in alignment with the center of the radii of the semi-circular base portion 798. A hole is formed through said disc member 800 and base portion 798 which is offset from the common center of the base portion 798 and the disc member 800 and in which the upper transverse shaft 678 is mounted thereby producing an eccentric. As a result, rotation of the shaft 678 produces linear movement of the pawl 802 formed on the outer end portion 804 of the pawl arm 796. The outer end portion 804 of arm 796 is adjustably connected to the base portion 798 by means of the nut-equipped bolts 806 threadedly engaging the base portion 798 through the slot 808 of the outer end portion 804.

The numeral 810 designates a stop arm, particularly FIGURES 4 and 6, formed of the arm portions 812 and 814 joined at the inner ends to form an obtuse angle, and formed at the outer end of the arm portion 810 is the upturned stop 812 which presents the outward stop shoulder edge 814. The stop arm 810 has a hole formed therethrough at the juncture of the arm portions 812 and 814, and the same is pivotally mounted on the pin 815 secured to and extending horizontally from the bracket 816 secured to the upright support wall 248. The stop shoulder edge 813 of arm 810 is urged upwardly by means of the coil spring 817 connected to the outer end of stop arm portion 812 and pin 818 extending from support wall 248. The upper limit of travel of arm portion 814 of stop arm 810 is determined by the horizontal stop flange 820 extending outwardly from bracket 822 connected to wall 248. The upper limit of travel of right pawl arm 796 is determined by the horizontal stop flange 824, and the pawl arm 796 is normally urged upwardly by means of the coil spring 826 similar to spring 790 and secured to pin 828 similar to pin 792 which extends from support wall 248, and also secured to the ear 830 similar to ear 794 formed on the lower edge of pawl arm 796. The right pawl arm 796 engages a rack of 146 of magazine 22 to move aperture plate 106 as will be hereinafter described.

Further provided is the sensor shaft assembly, particularly FIGURES 5, 6 and 8, including the transverse shaft 832 rotably connected at its outer ends to the support walls 248 and 250 and which overlies the upper forward rollers 314–332. The shaft 832 mounts a multiplicity of spaced light wire sensing fingers 834 depending downwardly therefrom and formed with an upturned arcuate lower feeler end 836. The sensing fingers 834 are so spaced on shaft 832 that the same depend downwardly between the rollers of upper and lower forward shafts 268 and 304 to a point slightly below the point of contact of the upper forward rollers with the lower forward rollers so that a piece of sheet film passing from the rollers will strike the sensing fingers 834 and pivotally move and lift the same forward thereby rotating the shaft 832, the purpose of which will be hereinafter set forth. There are a sufficient number of sensing fingers 834 whereby any size film sheet, no matter where it exists from the rollers 314–332, will contact a finger.

Mounted tangentially on the shaft 832 is the trip tab 838, particularly FIGURE 5, which is tilted upwardly as the shaft 832 is rotated by actuation of any of the sensing fingers 834. As the trip tab 838 is tilted it moves the small spring arm 840 of film microswitch 842 thereby actuating the same, the purpose of which will be hereinafter set forth. Also provided is the counterbalance 843 secured to shaft 832 which maintains a vertical position of the sensing fingers 834 and which aids in returning the sensing fingers to a normal vertical position after having been pivoted forwardly and upwardly by sheet film contacting and leaving the same, particularly FIGURES 6 and 8.

The numeral 844 designates a transverse guide plate, particularly FIGURES 5, 7 and 8, secured at its outer ends to the front ends of the elongated flange members 208 and 210 by means of the nut-equipped bolts 846 and 848, respectively. The guide plate 844 is positioned adjacent the lower forward rollers 284–302 whereby sheet film transported from the upper and lower forward rollers is deposited on the plate and directed to and picked up by the transport rollers R and Ra of the film processing unit B. The guide plate 844 extends forwardly of the front wall 182 of the base 178 through the elongated transversely extending aperture 847 formed in the wall. Further provided is the timer 848 and the bell 850 mounted on the base support 206.

It will be seen that the feed motor 688 actuates the right and left pawl arms 796 and 756, respectively, by means of the mechanism described while the belt motor 264 actuates all transport rollers, vertical belts 636 and 664 and main flat belt 720 by means of the mechanism described.

The teeth of racks 146 and 150 are spaced a distance equal to the distance between the film trays so that movement of the racks one tooth by engagement of the pawl arms advances the rear edge of the aperture plate from a point adjacent the bottom edge of one tray to a point adjacent the bottom edge of the next forward adjacent tray thereby allowing film to fall from one tray at a time.

*Canted roller operation*

When a film sheet drops from a tray 92 onto the main transport belt, the same may come to rest on the belt in a canted position, that is with the longitudinal axis thereof not parallel to the longitudinal axis of the base 178 or belt 720. As a result the film sheet will not proceed squarely through the feeder A, and the forward leading edge of the film sheet will not be presented parallel to the pinch rollers R and Ra of the processor B which is necessary for the correct passage of the film sheet through the processor B.

With the subject device A, a film sheet in a canted position on the belt is aligned with its forward front edge parallel to the forward rollers in the following manner: As the canted film sheet is carried by the belt 720 to the first set of rollers such as 706, 708 and the like, the sheet film is further transported thereby to and picked up by, for example, the right upper and lower canted rollers 382–398, and 410–420 which carry the film sheet to the vertical belt 636. When the corner of the film sheet contacts the vertical belt 636, the belt, in effect, carries the corner of the film sheet forward at a linear rate faster than that of the canted rollers thereby performing a type of pivoting movement of the film sheet whereby it is straightend out, i.e., its forward edge is caused to be parallel to the forward rollers, or put another way, normal to the longitudinal axis of the base 178 whereby the forward rollers eject the film sheet with the forward edge of the film sheet parallel to the pinch rollers R and Ra for proper pickup thereby. Thus, it will be seen that the canted rollers transport the sheet film transversely outwardly whereby the same are separated and conveyed to the vertical belts for straightening as described above as the case may be. The right bank of upper and lower canted rollers are pinched rollers, i.e., the same are compressed together with about $\frac{1}{16}$ inch compression as are the left bank of upper and lower canted rollers. All transport rollers are compressed together slightly. It will be seen that a film sheet carried by the main belt 720 that is not misaligned thereon presents no alignment problem and the same will be picked up by the various central transport rollers. The situation arises where two film sheets may be positioned in a single tray and when the two hit the belt the same may overlap. The film sheets cannot be processed through the processor B when overlapped. The overlapped sheet film on the right side is directed to the right by the first or right canted rollers and thus separated from the other film sheet. The sheet film on the left is directed to the left by the second, or left canted rollers thus aiding in and completing full separation of the film sheets.

*Operation*

The magazine 22 is loaded with exposed sheet film in the following manner in a darkroom: The magazine door 52 is opened and positioned against the shoulder stops of brackets 72 and 74 as shown in FIGURE 2. The hinged trays 92 are hingedly moved outwardly of the hopper 61 of the magazine and placed against the door 52 for easy access one by one. A film sheet is placed in the innermost fixed tray 92f. The rearmost hinged tray 92 is then pivotally moved to a position against the fixed tray 92f. A further film sheet is then placed in the rearmost hinged tray. Subsequent trays are pivoted into position against a previous tray and each loaded with sheet film. With all the trays 92 within the hopper 91 of magazine 22, the magazine hopper door 52 is then closed. During the loading of the trays with sheet film, the aperture plate 106 is normally held in a closed position by means of the flat coil springs 154 and 162 urging the aperture plate 106 to its rearmost position. With the film in a tray, the lower edge of the film rests on the ribs 104 of the plate 106. With the magazine door 52 closed and the aperture plate 106 closed, the loaded magazine is light-locked and may be removed from the darkroom and operated with the balance of the unit A in connection with a processor such as B in a lighted room. It will be noted that the sheet film first placed in the magazine is the first fed from the unit A to the processor.

Assuming that the base 178 of the unit A is operatively connected to the processor B as illustrated, particularly in FIGURE 5, the magazine 22 is placed on the base 178 with the pins 169 and 171 in the sockets 170 and 172 and the partial front, rear, and side walls of the magazine base 30 positioned in the peripheral channel 200. Generally speaking, when magazine 22 is so positioned the rear end of rack 150, FIGURE 3, depresses the spring-loaded ratchet switch 852. With the magazine 22 in position, the main power switch 854 is manually actuated which starts the feed motor 688 through the circuitry provided and as a result the pawl arms 756 and 796 are actuated whereby the pawls 762 and 802 thereof engage the first forward tooth of each of the racks 150 and 146, respectively, of the magazine thereby drawing the aperture plate 106 forwardly against the action of the flat coil springs 154 and 162. As this first movement of the aperture plate is accomplished, the transverse lip 140 of plate 106 is moved from its position below the forward edge of horizontal plate member 138 thereby breaking the light seal of the magazine at that point and completing one cycle. The aperture plate 106 is held in its first cycle advanced position and prevented from returning to its former position, as in succeeding cycles, by means of the stop shoulder edges 778 and 814 of stop arms 770 and 810, respectively, engaging the teeth of racks 150 and 146, respectively. The feed motor 688 continues to operate by means of the circuitry shown and described hereinafter and continues to actuate the pawl arms 796 and 756, the pawls of which engage the second tooth of each rack 146 and 150 and thereby advance the aperture plate 106 an additional rack tooth thereby completing a second cycle whereby the rearmost points 856 of ribs 104 supporting the film, FIGURES 14 and 15, are withdrawn past the lower end of the rearmost fixed tray 92f. As a result, a sheet of film previously supported by the ribs 104 within the rearmost tray 92f drops downwardly onto the main belt 720 for transport, the belt 720 being stationary at the precise moment the film sheet hits it. Also during the second cycle the rear end of the rack 150 is drawn off the ratchet switch 852 thereby returning the switch to normal open position. One cycle is considered as the movement of the racks one tooth thereof. At this point the first film sheet has dropped from the rear fixed tray 92f to belt 720, the belt motor having been started by cam switch 759, and is transported by the belt 720 generally to the rollers 700, 706, 708, 704, 716, 714, 712 and 702 thence to the rollers 472–518 and ejected by upper forward rollers 314–332 and lower forward rollers 284–302. Because the sheets of film cannot be overlapped endwise as they leave the unit due to the requirement of the processor B, a given sheet must substantially clear the forward rollers before a further film sheet is deposited on the belt 720 from the magazine 22. This is required also because the roller speed of the unit A is substantially greater than that of the pinch rollers R and Ra of processor B. Thus, the feed motor 688 which actuates the pawl arms is stopped, and this is done by the pin 755 of timing disc 753 depressing the lever arm 757 of cam switch 759. Also, with the depression of the switch arm 757, the belt motor 264 is started which in point of time is after a film sheet has hit the belt 720, thus the belt 720 is stationary when a film sheet hits it. With the belt 720 stopped as the film sheet hits it, there is a brief period for the film sheet to adjust squarely to the belt and thereby fall onto the belt with its longitudinal axis parallel to the longitudinal axis of the belt 720. The film sheet is transported by the belt 720 to the rollers of shaft 456 and thence to the various canted rollers heretofore described. The action of the various canted rollers in aligning misaligned film sheet and separating overlapped film sheet has been heretofore described.

As the leading edge of the film sheet leaves the forward rollers on shafts 268 and 304 the film contacts and lifts the sensing fingers 834. As a result the shaft 832 is rotated slightly thereby causing the trip tab 838 thereon to actuate switch arm 840 of film switch 842 until the rear edge of the given film sheet clears the sensing fingers thereby returning the fingers to normal vertical position. With the fingers returned to normal, the timer 848 is started through the circuitry provided which starts the feed motor 688 after a preset time which in turn actuates the pawl arms 796 and 756 which withdraw the racks 146 and 150 an additional tooth thereof thereby withdrawing the rearmost ends 856 of ribs 104 of the aperture plate 106 to thereby allow a film sheet or sheets in the next tray 92 to fall upon the belt 720 which completes a third cycle. As a result of the timer 848 starting the feed motor 688 a preset time after the sheet film has cleared the sensing fingers, the sheet film delivery is thereby spaced. The aperture plate 106 is held in each of its advanced positions by means of the stop shoulders 778 and 814 of stop arms 770 and 810, respectively, engaging teeth of the racks 150 and 146, respectively, of the aperture plate. The cycling is repeated until the sheet film in all of the trays are sequentially released to the belt 720 and transported as set forth above. When the last film sheet passes the sensing fingers a further cycle is started and the aperture plate is moved whereby the rear end of the rack 150 strikes the arm 857 of switch 858 thereby stopping feed motor 688 and belt motor 264 and ringing a buzzer 860 provided in the circuitry to indicate that the unit is empty of film.

In the event that a film sheet is not placed in a tray 92 or does not leave a tray due to improper loading and there is therefore no film sheet to actuate the sensing fingers 834, the cycling is interrupted due to the fact that film switch 842 is not actuated due to the absence of a film sheet.

After a preset time with no film sheet, the stall conditioner timer 862 starts the feed motor 688 by means of circuitry in FIGURE 13 hereinafter described. As a result of the starting of the feed motor the pawl arms are again actuated and perform a further cycle and continue in the manner heretofore described.

At times it is highly desirable to feed sheet film by means of the feeder to the processor B manually and not wait for the magazine 22 to empty. This is particularly true in an emergency where a sheet film must be fed to the processor without any delay. In this case, the rear access door 864 may be opened in a darkened room provided the signal light 866 is "off" and the same is "off" when a film has been discharged from the magazine and is in the process of going through the forward upper and lower rollers on shafts 304 and 268. The light 866 is "off" when the sensing fingers are raised slightly by contact with film coming from the upper and lower forward rollers. The light 866 is still "off" when the film is being transported between forward upper and lower rollers and the pinch rollers R and Ra of the processor. The light 866 is actuated by the circuitry disclosed and described herein.

With the light 866 "off," the access door 864 may be opened in a darkened room and when so opened the releasing of the door 864 actuates switch 868, FIGURES 3 and 13, allowing the belt motor 264 to continue to run and disabling the feed motor 688 through the circuitry provided so that no film will be discharged from the magazine 22 while the access door 864 is opened. With the access door open, the operator must wait until the signal light 866 is "on" before inserting film through the door and onto the moving main feed belt 720. The light 866 goes "on" when the circuitry calls for a film from the magazine; however, no film is delivered due to the fact that the feed motor is disabled. Therefore, with the light "on" film may be inserted through the open door 864 because there is no film in the base.

Normally when the fingers 834 return to a normal position, the feed motor 688 is started after a preset time as heretofore described. However, when the door 864 was opened the door switch 868 disabled feed motor 688 through the circuitry provided as heretofore and hereafter set forth. As long as the access door 864 is open and the signal light 866 is "on" a film sheet may be inserted through the access door 864 into the feeder. This operation may be continued each time the light goes "on."

The door 864 may be closed only when the light 866 is "off" and the light is "off" only when the last manually inserted film sheet is still in roller process. With the door 864 closed and with the last film sheet passing the fingers 834, the light 866 will then go "on" and the cycling of the unit will be continued.

When the unit A is empty of film as heretofore described, the main power switch is turned "off" and the magazine lifted sufficiently to allow disengagement of the stop arms 770 and 810 from the teeth of racks 150 and 146, respectively, whereby the aperture plate returns to its rearmost or closed position. In this condition the magazine can be reloaded on the base in a darkened room or removed to a darkroom and loaded. The foregoing is more fully explained by that which follows.

*Circuitry operation*

With particular regard to FIGURE 13, the circuitry diagram, the operation of the device A is as follows: Assuming the main power switch 854 is "off" as described, the rear access door 864 is closed and the magazine 22 is loaded and in place as heretofore described. The main power switch 854 is now depressed, and as a result the relay 880 is energized closing contacts 882 and opening contacts 884 of relay 880 which allows timer 862 to start to return to zero. Feed motor 688 has been started by main switch 854 and makes one and one-half revolutions drawing the rack 150 off the ratchet switch 852 which switch returns to normal position. Relay 880 remains energized through contacts 882, the closed contacts 886 on the cam switch 759 and the closed contacts 888 on the ratchet switch 852.

The feed motor 688 which actuates the pawl arm continues for another one-half revolution during which a sheet of film is dropped from the magazine onto the belt 720, and the cam switch 759 is actuated thereby de-energizing relay 880 and opening contacts 882 thereby stopping feed motor 688. The cam switch 759 momentarily closes the circuit to relay 890 which is thereby energized and held in, due to the closing of contacts 892. As a result of actuation of cam switch 759, contacts 894 are also closed starting the belt motor 264 after the film sheet has been deposited on the belt. The belt 720 is not moving at the time the film sheet strikes it for the reason hereinbefore set forth. As the film starts to leave the last forward rollers, film switch 842 is actuated, as heretofore set forth turning lamp 866 "off" and energizing relay 896, opening contacts 898 and contacts 900 and closing contacts 902 thereby allowing the capacitor 904 to become charged. With contacts 900 open, timer 862 continues to return to zero position.

As the film leaves the last forward rollers, the film switch 842 returns to normal, relay 896 is de-energized thereby opening contacts 902 and closing contacts 898 allowing the capacitor 904 to discharge and energize relay 906 which is held in due to the closing of contacts 908. Contacts 910 are also switched, relay 906 keeping lamp 866 "off" and starting timer 848 which will allow the film enough time to clear the pinch rollers R and Ra of the processor unit B.

After the time determined by timer 848 has elapsed, contacts 912 momentarily close thereby energizing relay 914, opening contacts 916 and de-energizing relay 906. As a result of the de-energizing of relay 906, contacts 910 return to normal position and light 866 goes "on." Also, after the time interval of timer 848 has lapsed, contacts 918 momentarily open thereby de-energizing relay 890 and contacts 894 which stops the belt motor 264. When relay 914 is momentarily energized, contacts 920 close momentarily energizing relay 880 and starting the cycle again.

When the aperture plate 106 reaches the end of travel after the last film has been dropped, the arm 857 of switch 858 is actuated thereby disabling the feeding motor 688 and ringing the buzzer 860.

With further regard to the stalled condition due to the lack of film from a tray heretofore discussed, recovery from the stalled condition is accomplished by the timer 862 being actuated after the sheet film has left the sensing fingers 834. Normally, the timer 862 begins timing at the start of each cycle when relay 896 and relay 880 are energized thereby opening contacts 900 and contacts 884 causing timer 862 to return to zero position. In the so-called stalled condition, the timer 862 continues timing and after a preset time contacts 922 are closed and automatic cycling is resumed.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A device for storing and feeding sheet film to a film processor comprising:
   (a) a magazine having a base portion and
   (b) a hopper mounted thereon,
   (c) means for positioning sheet film in said hopper,
   (d) a main base,
   (e) means for mounting said magazine on said main base, (f) means for ejecting sheet film from said hopper into said main base, (g) means in said main base for receiving sheet film ejected from said hopper and transporting the same through and outwardly of said main base.

2. The device of claim 1 including means in said main base for separating sheet film transported by said receiving and transporting means and aligning the leading edge thereof parallel to the axis of said transport rollers which sheet film is not so aligned as it is transported.

3. A device for storing and feeding sheet film to a film processor comprising:
(a) a storage magazine having a base portion,
(b) a hopper mounted on said base portion,
(c) a multiplicity of sheet film trays mounted in said hopper,
(d) means for gaining access to said film trays to place sheet film therein,
(e) a main base,
(f) a roller-mounted belt mounted in said main base for transporting sheet film received from said hopper,
(g) transport rollers mounted in said base for transporting sheet film received from said belt,
(h) means for transferring sheet film sequentially from each of said film trays to said belt to be transported thereby to said transport rollers for transporting thereby and ejection from said base,
(i) sensing means for actuating said sheet film transferring means when a sheet film has been transported from said transport rollers.

4. The device of claim 3 wherein said sensing means includes switch-actuated finger members, said finger members responsive to the presence and lack thereof of sheet film at the last of said transport rollers.

5. The device of claim 3 including means in said main base for separating sheet film transported by said transport rollers and aligning the leading edge thereof parallel to the axis of said transport rollers which sheet film is not so aligned as it leaves said belt.

6. A device for storing and feeding film sheets to a film processor comprising:
(a) a storage magazine having a base portion,
(b) a hopper portion mounted on said base portion,
(c) said hopper having an access opening closeable by a door connected thereto,
(d) a multiplicity of film sheet trays pivotally mounted in said hopper for pivotal extension outwardly of said access opening of said hopper when said door is opened,
(e) said magazine base portion having an aperture formed therein,
(f) an aperture plate reciprocably mounted on said magazine base portion beneath said film trays and normally covering said aperture,
(g) a main base,
(h) means for removably mounting said magazine on said main base,
(i) a roller-mounted belt mounted in said main base for transporting film sheet received from said hopper,
(j) a multiplicity of transport rollers mounted in said main base for transporting film sheet received from said belt,
(k) the axis of said transport rollers being normal to the longitudinal axis of said main base,
(l) means for driving said belt and said transport rollers,
(m) means for intermittently and progressively advancing said aperture plate with respect to said aperture of said magazine base to allow film sheets in said film trays and resting on said aperture plate to be released sequentially through said aperture and drop onto said belt and be transported thereby to said transport rollers for transporting thereby and ejection from said main base.

7. The device of claim 6 wherein said means for advancing said aperture plate includes:
(a) first and second toothed racks connected to said aperture plate,
(b) first and second arms mounted on said main base,
(c) each of said arms having a pawl formed thereon,
(d) means for intermittently actuating said first and second arms in unison to cause said pawls thereof to engage teeth of said first and second racks, respectively, to thereby move the same.

8. The device of claim 6 further characterized by:
(a) means for stopping said belt actuating means when the film sheet is released from a tray through said aperture to allow the film sheet to orient on said belt when the belt is stopped, and
(b) means for starting said belt actuating means after the sheet film has been received by the belt.

9. The device of claim 6 further characterized by:
(a) first and second canted rollers mounted in said main base,
(b) the axis of each of said first and second canted rollers being angularly disposed relative to the axis of said transport rollers to carry film sheet outwardly from the longitudinal axis of the main base,
(c) first vertically disposed roller-mounted belt means positioned adjacent said first canted rollers,
(d) second vertically disposed roller-mounted belt means positioned adjacent said second canted rollers,
(e) means for driving said first and second vertical belt means,
(f) means for driving said first and second canted rollers,
(g) said first and second vertical belts causing sheet film carried to and contacting the same by said canted rollers to be aligned with the leading edge of the sheet film parallel to the axis of the transport rollers.

10. A device for storing and feeding sheet film to a film processor comprising:
(a) a storage magazine having a base portion,
(b) a hopper mounted on said base portion,
(c) said hopper having an access opening closeable by a door connected thereto,
(d) a multiplicity of sheet film trays pivotally mounted in said hopper for pivotal extension outwardly of said access opening of said hopper when said door is opened,
(e) a main base,
(f) means for removably mounting said magazine on said main base,
(g) said magazine base portion having an aperture formed therein,
(h) an aperture plate reciprocably mounted on said magazine base portion and normally covering said aperture of said magazine base portion,
(i) carrier means mounted in said main base for transporting sheet film,
(j) means for operating said carrier means,
(k) means for intermittently and progressively advancing said aperture plate to open said aperture of said magazine base to allow sheet film in said film trays and resting on said aperture plate to sequentially drop onto said carrier means of said main base to be transported thereby and ejected from the device.

11. A device for storing and feeding sheet film to a film processor comprising:
(a) a main base,
(b) an enclosed magazine having a hopper and removably mounted on said main base,
(c) a multiplicity of sheet film trays mounted in said hopper,
(d) means for gaining access to said film trays to place sheet film therein,
(e) a roller-mounted belt mounted in said main base for transporting sheet film received from said hopper, (f) transport rollers mounted in said main base for transporting sheet film received from said belt, (g) the axis of said transport rollers being normal to the longitudinal axis of said main base, (h) means for driving said belt and said transport rollers, (i) means for intermittently and progressively advancing said aperture plate to open said aperture of said magazine base to allow film in said film trays and resting on said aperture plate to sequentially drop onto said belt and be transported thereby to said transport rollers for transporting thereby and ejection from the device, (j) first and second canted rollers, (k) the axis of each of said first and second canted rollers being angularly disposed relative to the axis of said transport rollers to carry film sheet outwardly from the longitudinal axis of the main base which contacts said canted rollers, (l) means for rotating said first and second canted rollers, (m) first vertically disposed roller-mounted belt means positioned adjacent said first canted rollers, (n) second vertically disposed roller-mounted belt means positioned adjacent said second canted rollers, (o) means for actuating said first and second vertical belt means, said first and second vertical belts causing sheet film carried to and contacting the same by the canted rollers to be aligned with the leading edge of the sheet film parallel to the axis of the transport rollers.

12. A device for storing and feeding sheet film to a film processor comprising:
(a) a magazine having a base portion and
(b) a hopper mounted thereon,
(c) means for positioning sheet film in said hopper,
(d) a main base,
(e) means for mounting said magazine on said main base,
(f) means on said magazine for ejecting sheet film from said hopper into said main base,
(g) roller-mounted belt means mounted in said main base for transporting sheet film received from said hopper,
(h) a multiplicity of transport rollers mounted in said main base for receiving sheet film from said belt means and transporting the same through and outwardly of said main base,
(i) first and second canted rollers,
(j) the axis of each of said canted rollers being angularly disposed relative to the axis of said transport rollers,
(k) first vertically disposed roller-mounted belt means positioned adjacent said first canted rollers,
(l) second vertically disposed roller-mounted belt means positioned adjacent said second canted rollers,
(m) means for actuating said first and second canted rollers,
(n) means for actuating said first and second vertical belt means, said first and second vertical belt means causing sheet film carried to and contacting the same by the canted rollers to be aligned with the leading edge of the sheet film parallel to the axis of the transport rollers.

13. A device for storing and feeding film sheets to a film processor comprising:
(a) a main base,
(b) a hopper mounted on said main base,
(c) means for storing film sheet in said hopper,
(d) a roller-mounted belt mounted in said main base,
(e) means for transferring sheet film seqentially from said hopper to said belt in said main base,
(f) means for actuating said belt,
(g) transport rollers mounted in said main base for transporting sheet film received from said belt through said base and outwardly thereof,
(h) means for actuating said transport rollers,
(i) first upper and lower canted rollers mounted in said base adjacent said transport rollers,
(j) second upper and lower canted rollers mounted in said base adjacent said transport rollers,
(k) means for actuatnig said first and second upper and lower rollers,
(l) the axis of said first canted rollers and said second canted rollers being angularly disposed to the axis of said transport rollers to carry outwardly from the longitudinal axis of the main base the sheet film which contacts said canted rollers,
(m) means for limiting the outward travel of film sheet caused by said canted rollers to thereby cause the leading edge of the film sheet to be aligned parallel to the axis of the transport rollers.

14. The device of claim 13 including means for actuating said sheet film transferring means when a sheet film has left said transport rollers.

15. A magazine for containing sheet film for delivery to a base having sheet feeding mechanism comprising:
(a) a base portion,
(b) a hopper portion mounted on said base portion,
(c) said hopper having an access opening closeable by a door connected thereto,
(d) a multiplicity of sheet film trays pivotally mounted in said hopper for pivotal extension outwardly of said access opening of said hopper when said door is opened,
(e) said magazine base portion having an aperture formed therein,
(f) an aperture plate reciprocably mounted on said magazine base portion and normally covering said aperture of said magazine base portion,
(g) means connected to said aperture plate for engagement with actuating means of a base member for advancement of said aperture plate to allow sheet film to drop sequentially from said trays with said magazine positioned on the base having sheet feeding mechanism.

16. The device of claim 15 wherein said hopper is inclined rearwardly with respect to the vertical axis of said base portion.

17. The device of claim 15 including means for excluding light from said hopper portion.

18. A magazine for containing sheet film for delivery to a base having sheet feeding mechanism comprising:
(a) a base portion,
(b) a hopper portion mounted on said base portion,
(c) said hopper having an access opening closeable by a door connected thereto,
(d) a multiplicity of sheet film trays pivotally mounted in said hopper for pivotal extension outwardly of said access opening of said hopper when said door is opened,
(e) said magazine base portion having an aperture formed therein,
(f) an aperture plate reciprocably mounted on said magazine base portion and normally covering said aperture of said magazine base portion,
(g) a pair of toothed racks connected to said aperture plate for engagement with an intermittently actuated pair of pawl means for intermittent advancement of said aperture plate to allow sheet film to drop sequentially from said trays with said magazine positioned on the base member.

19. The device of claim 18 wherein said hopper is inclined rearwardly with respect to the vertical axis of said base portion.

20. A device for storing and feeding sheet film to a film processor comprising:
(a) a magazine having a base portion,
(b) a hopper mounted on said base portion, (c) means for positioning sheet film in said hopper,
(d) a main base,
(e) means for positioning said magazine on said main base,
(f) means for ejecting sheet film from said hopper into said main base,
(g) means in said main base for receiving sheet film ejected from said hopper and transporting the same through and outwardly of the said main base for delivery to a film processor, and
(h) sensing means for actuating said sheet film ejecting means responsive to the absence of sheet film at said film transporting means.

21. A device for storing and feeding sheet film to a film processor comprising:
(a) a magazine having a base portion,
(b) a hopper mounted on said base portion,
(c) means for positioning sheet film in said hopper,
(d) a main base,
(e) means for positioning said magazine on said main base,
(f) means for ejecting sheet film from said hopper into said main base,
(g) means in said main base for receiving sheet film ejected from said hopper and transporting the same through and outwardly of the said main base for delivery to a film processor,
(h) sensing means for actuating said sheet film ejecting means responsive to the absence of sheet film at said film transporting means, and
(i) means for stopping said film transporting and receiving means as film is received from said film ejecting means.

22. A device for storing and feeding sheet film to a film processor comprising:
(a) a magazine having a base portion,
(b) a hopper mounted on said base portion,
(c) means for positioning sheet film in said hopper,
(d) a main base,
(e) means for positioning said magazine on said main base,
(f) means for ejecting sheet film from said hopper into said main base,
(g) means in said main base for receiving sheet film ejected from said hopper and transporting the same through and outwardly of the said main base for delivery to a film processor,
(h) sensing means for actuating said sheet film ejecting means responsive to the absence of sheet film at said film transporting means,
(i) means for temporarily stopping said film transporting and receiving means as film is received from said film ejecting means, and
(j) means for aligning and separating the leading edge of film sheet transported by said film transporting means perpendicular to the longitudinal axis of said main base.

23. The device of claim 22 including means for starting said film transporting means responsive to said film ejecting means.

24. A device for storing and feeding sheet film to a film processor comprising:
(a) a magazine having a base portion,
(b) a hopper mounted on said base portion,
(c) means for positioning sheet film in said hopper,
(d) a main base,
(e) means for positioning said magazine on said main base,
(f) means for ejecting sheet film from said hopper into said main base,
(g) driven belt means in said main base for receiving sheet film ejected from said hopper and transporting the same,
(h) a multiplicity of driven rollers mounted in said main base for transporting sheet film received from said belt means through said main base and outwardly thereof,
(i) sensing finger means for actuating said sheet film ejecting means responsive to the absence of sheet film at said film transporting means,
(j) timer means for stopping said belt means and starting said film ejection means,
(k) means for starting said belt means responsive to said film ejecting means, and
(l) roller means for separating and aligning the leading edge of film sheet transported by said transporting rollers perpendicular to the longitudinal axis of said main base.

25. A unit device for transporting sheet material comprising:
(a) a base,
(b) a multiplicity of driven film transport rollers mounted in said base,
(c) first upper and lower driven canted rollers mounted in said base adjacent said transport rollers,
(d) second upper and lower driven canted rollers mounted in said base adjacent said transport rollers,
(e) the axis of said first canted rollers and said second canted rollers being angularly disposed to the axis of said transport rollers to carry outwardly from the longitudinal axis of the main base the sheet film which contacts said canted rollers,
(f) means adjacent each of said first and second canted rollers for limiting the outward travel of film sheet caused by said canted rollers to thereby cause the leading edge of the film sheet to be aligned parallel to the axis of the transport rollers.

26. A unit device for transporting sheet material comprising:
(a) a base,
(b) a multiplicity of driven film transport rollers mounted in said base,
(c) first upper and lower driven canted rollers mounted in said base adjacent said transport rollers,
(d) second upper and lower driven canted rollers mounted in said base adjacent said transport rollers,
(e) the axis of said first canted rollers and said second canted rollers being angularly disposed to the axis of said transport rollers to carry outwardly from the longitudinal axis of the main base the sheet film which contacts said canted rollers,
(f) driven vertical belt means adjacent each of said canted rollers for limiting the outward travel of film sheet caused by said canted rollers to thereby cause the leading edge of the film sheet to be aligned parallel to the axis of the transport rollers.

27. The device of claim 26 including means for causing the linear speed of travel of said vertical belt means to exceed the linear speed of travel of sheet film transported by said canted rollers.

28. A unit device for transporting sheet material comprising:
(a) a base,
(b) a driven belt for receiving sheet film mounted in said base,
(c) a multiplicity of driven transport rollers mounted in said base and adapted to receive sheet film from said belt for transporting the film through and outwardly of said base,
(d) a first set of upper and lower driven canted rollers mounted in said base adjacent said transport,
(e) a second set of upper and lower driven canted rollers mounted in said base adjacent said transport rollers,
(f) the axis of said first and second sets of canted rollers being angularly disposed to the axis of said transport rollers to carry outwardly from the longitudinal axis of the base the sheet film which contacts said canted rollers,
(g) driven vertical belt means adjacent each set of said canted rollers for limiting the outward travel of film sheet caused by said canted rollers to thereby cause the leading edge of the film sheet to be aligned parallel to the axis of the transport rollers.

29. A device for storing and feeding sheet film to a film processor comprising:
 (a) a magazine having a base portion,
 (b) a hopper mounted on said base portion,
 (c) means for positioning sheet film in said hopper,
 (d) a main base,
 (e) means for positioning said magazine on said main base,
 (f) means for ejecting sheet film from said hopper into said main base,
 (g) means in said main base for receiving sheet film ejected from said hopper and transporting the same through and outwardly of the said main base for delivery to a film processor,
 (h) sensing means for actuating said sheet film ejecting means responsive to the absence of sheet film at said film transporting means,
 (i) means for stopping said film transporting and receiving means as film is received from said film ejecting means,
 (j) said main base having an opening for manually inserting sheet film thereinto and onto said sheet receiving and transporting means, and
 (k) means for opening and closing off said main base opening.

30. A device for storing and feeding sheet film to a film processor comprising:
 (a) a storage magazine having a base portion and
 (b) a hopper mounted thereon,
 (c) said hopper having an access opening closeable by
 (d) a door connected thereto,
 (e) a multiplicity of sheet film trays pivotally mounted in said hopper for pivotal extension outwardly of said access opening when said door is opened,
 (f) a main base,
 (g) means for mounting said magazine base portion on said main base,
 (h) means for transferring sheet film from each of said trays into said main base,
 (i) a driven roller-mounted belt in said main base for transporting sheet film received from said hopper,
 (j) driven transport rollers mounted in said base for transporting sheet film received from said belt,
 (k) means for intermittently actuating said sheet film transferring means,
 (l) means for stopping said belt momentarily to receive sheet film transferred from said hopper,
 (m) means for starting said belt for delivery of sheet film thereon to said transport rollers, and
 (n) means in said main base for sepaarting sheet film transported by said rollers and aligning the leading edge thereof parallel to the axis of said transport rollers.

31. The device of claim 30 wherein said sheet separating and aligning means includes:
 (a) first and second canted rollers,
 (b) the axis of each of said canted rollers being angularly disposed relative to the axis of said transport rollers,
 (c) first vertically disposed roller-mounted belt means positioned adjacent said first canted rollers,
 (d) second vertically disposed roller-mounted belt means positioned adjacent said second canted rollers,
 (e) means for actuating said first and second canted rollers, and
 (f) means for actuting said first and second vertical belt means.

References Cited by the Examiner
UNITED STATES PATENTS

| 2,444,170 | 6/1948 | Sabel et al. | 95—89 |
| 2,980,006 | 4/1961 | Nieuwenhoven et al. | 95—90 |

ROBERT B. REEVES, *Primary Examiner.*

STANLEY H. TOLLBERG, *Examiner.*